F. A. HART.
COMBINED TYPEWRITING AND COMPUTING MACHINE.
APPLICATION FILED JUNE 25, 1917.
1,338,014.
Patented Apr. 27, 1920.
10 SHEETS—SHEET 1.
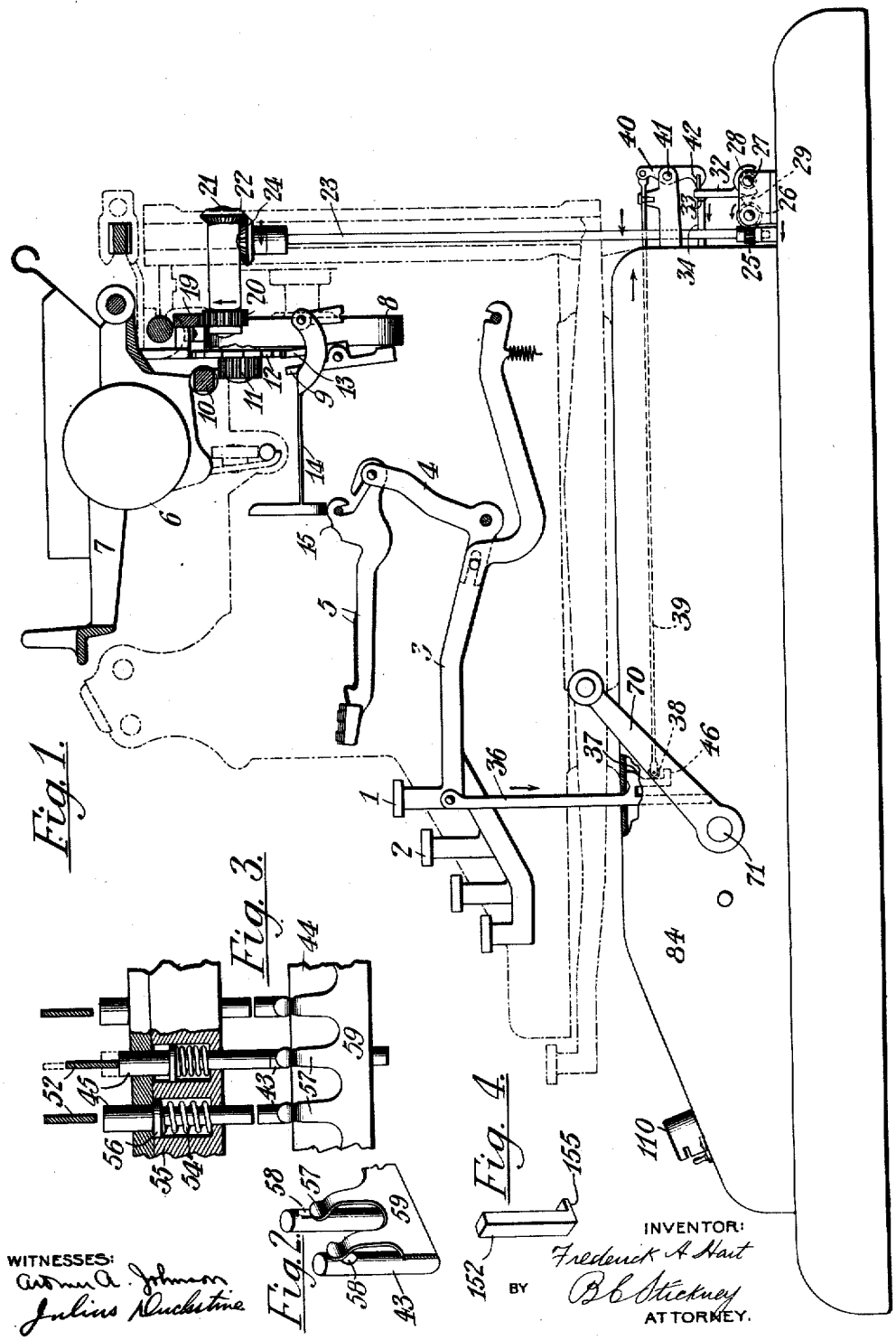
INVENTOR:
Frederick A. Hart
BY B.C. Stickney
ATTORNEY.
WITNESSES:

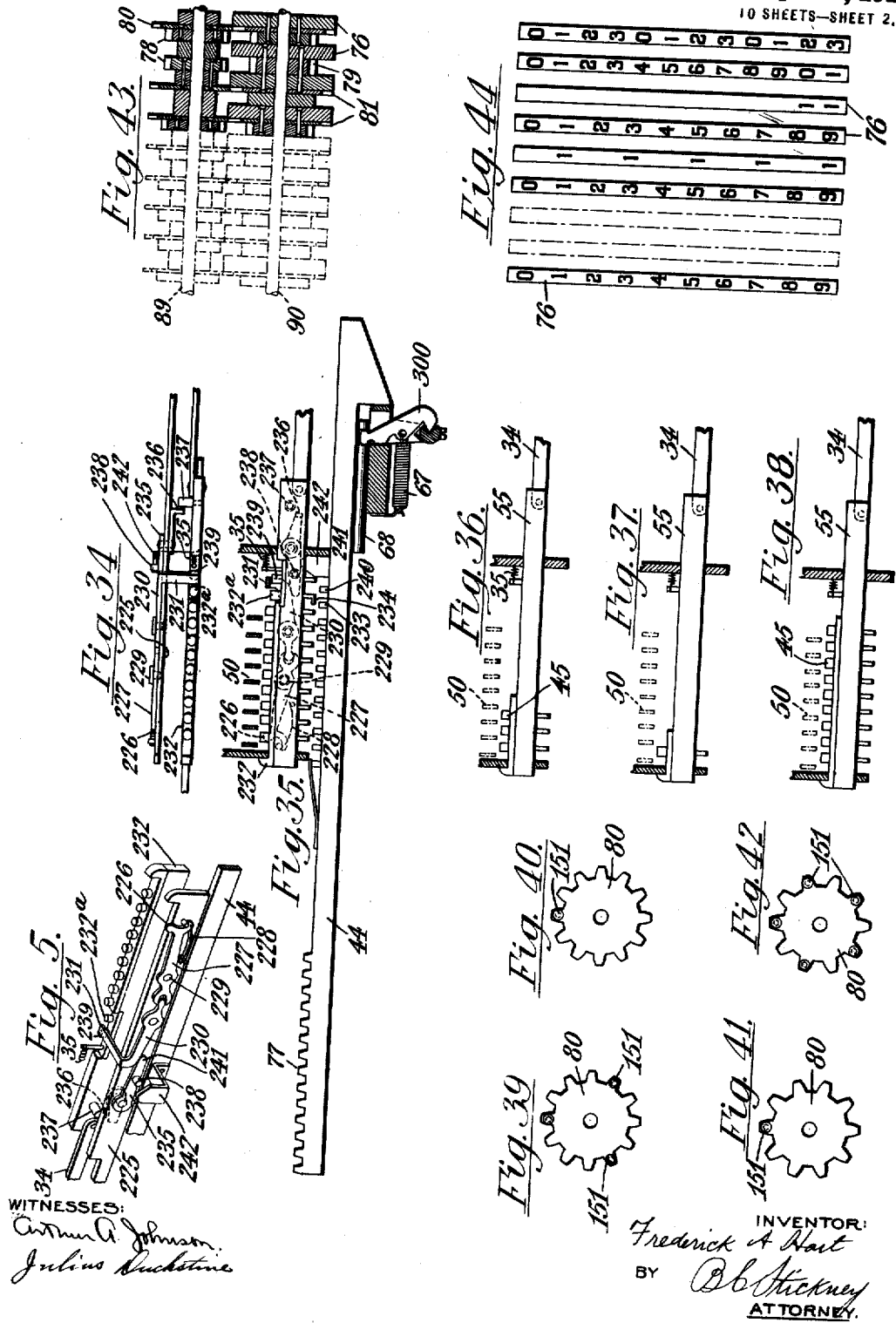

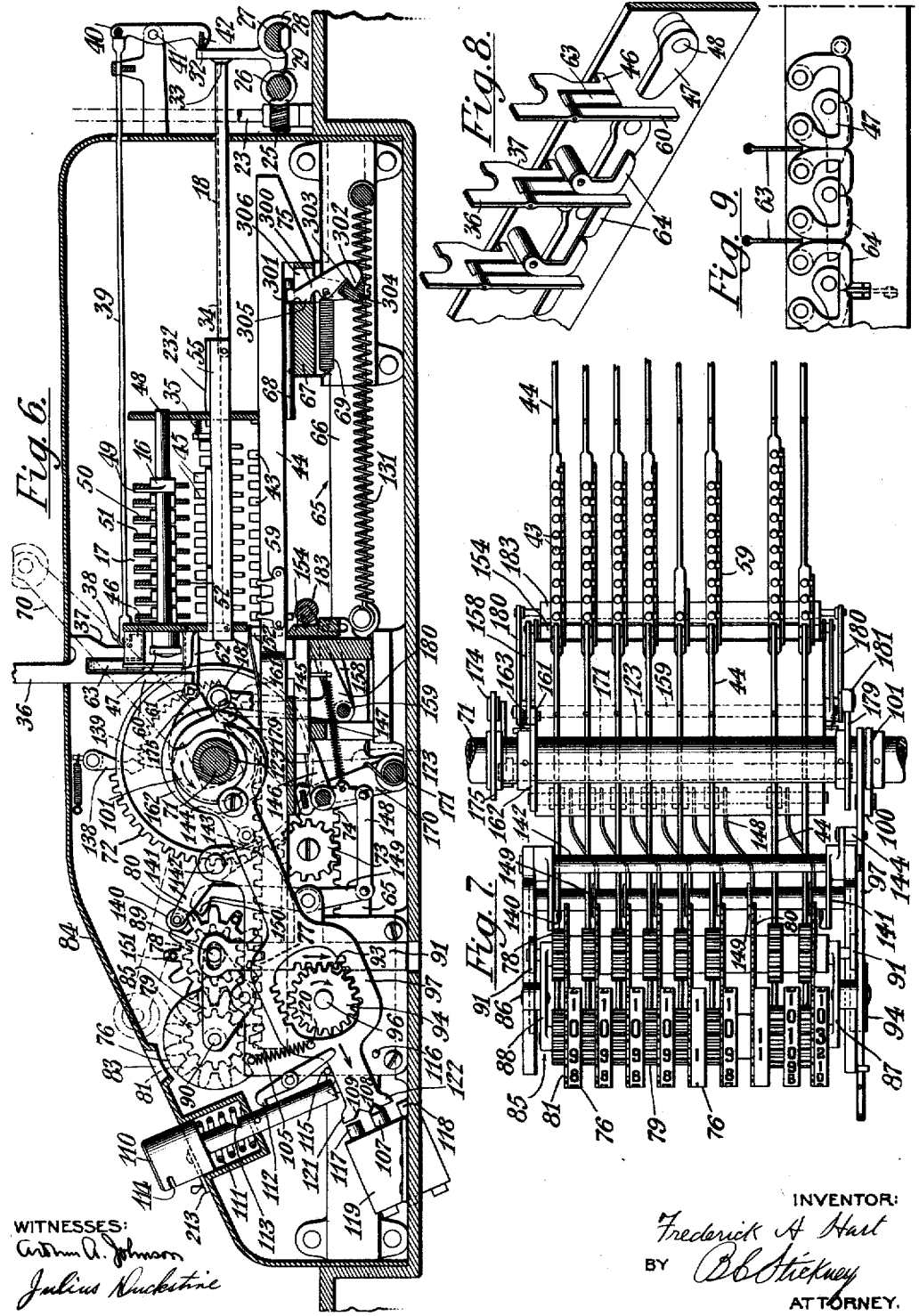

F. A. HART.
COMBINED TYPEWRITING AND COMPUTING MACHINE.
APPLICATION FILED JUNE 25, 1917.
1,338,014. Patented Apr. 27, 1920.
10 SHEETS—SHEET 4.
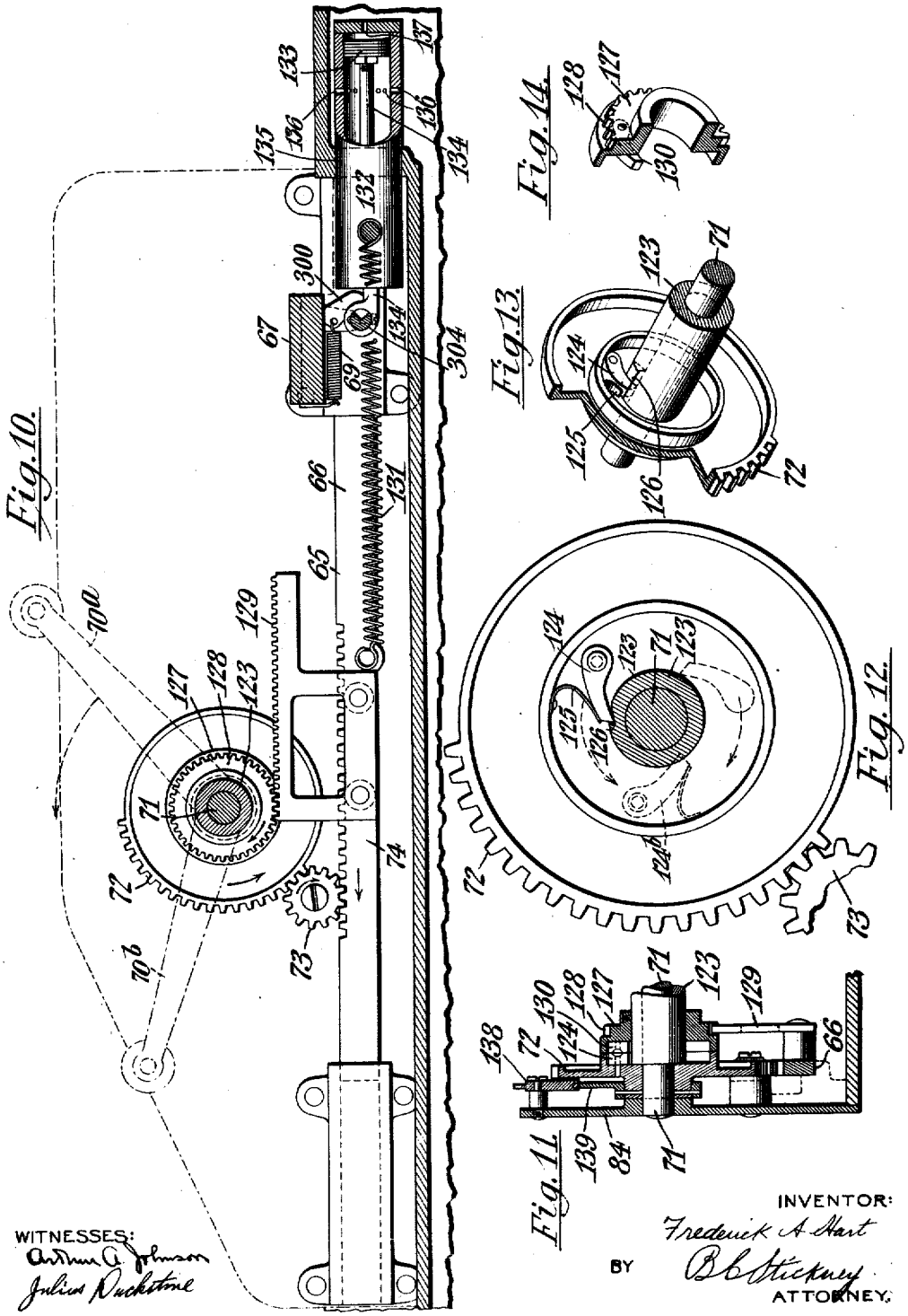

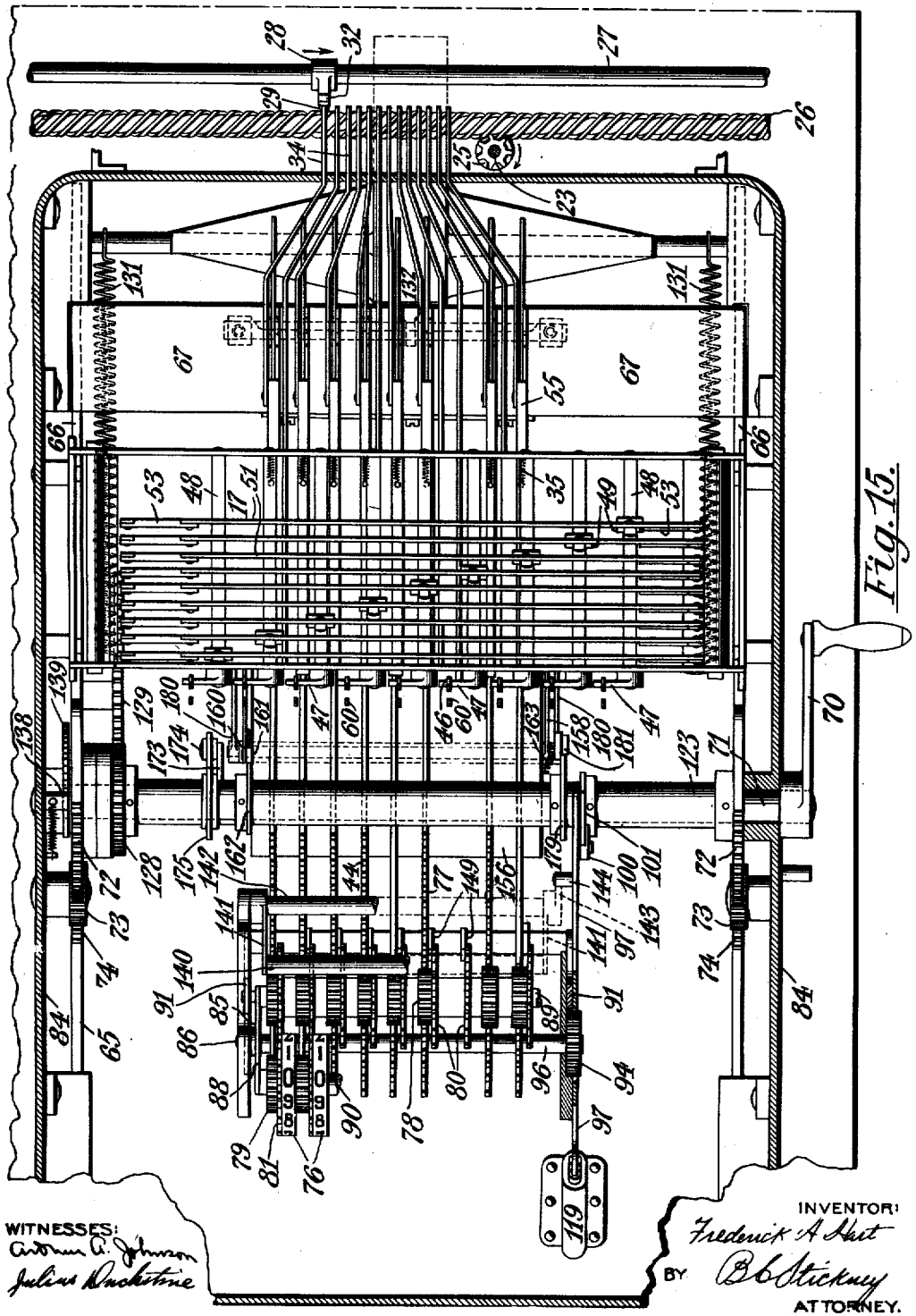

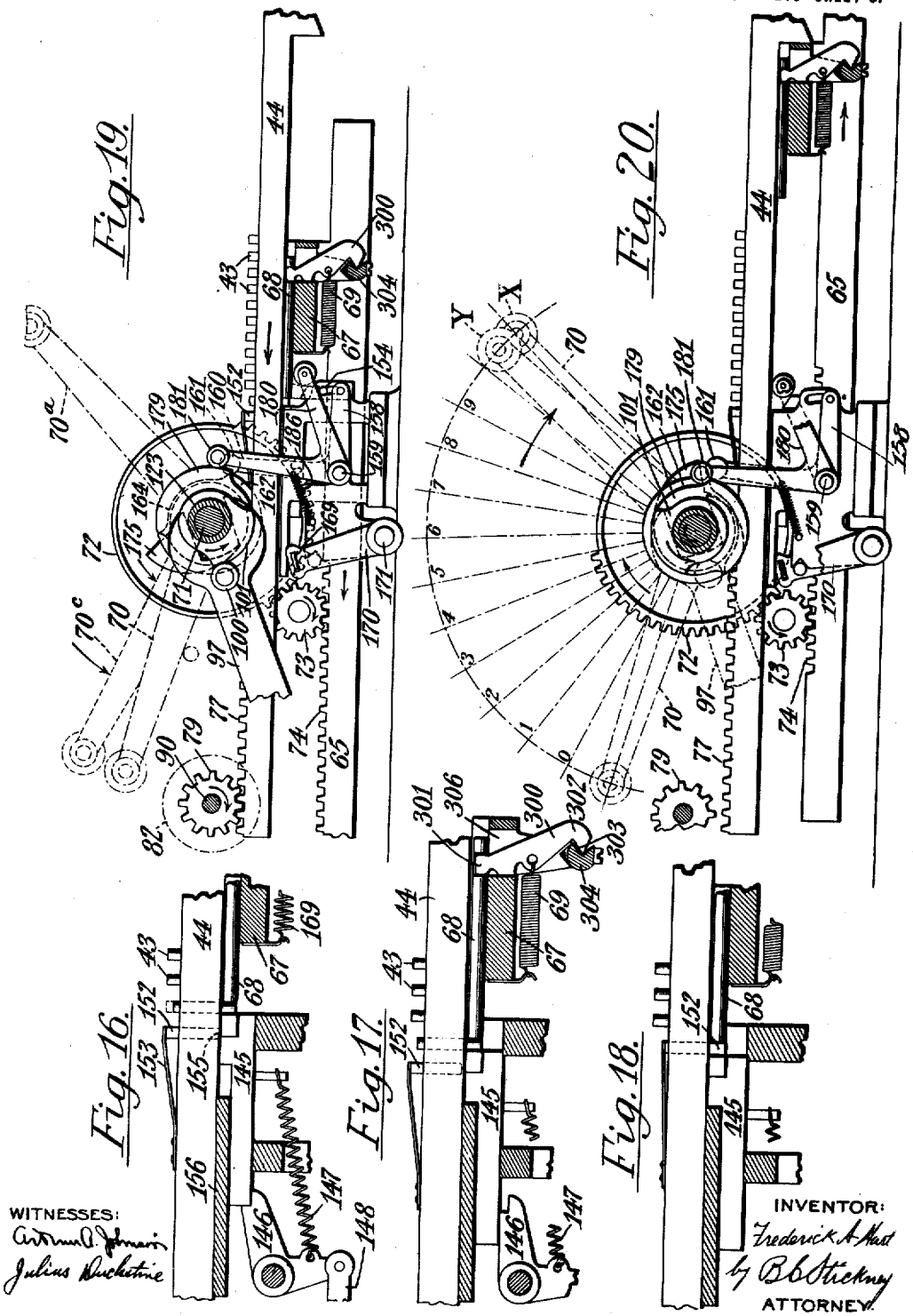

F. A. HART.
COMBINED TYPEWRITING AND COMPUTING MACHINE.
APPLICATION FILED JUNE 25, 1917.
1,338,014. Patented Apr. 27, 1920.
10 SHEETS—SHEET 7.
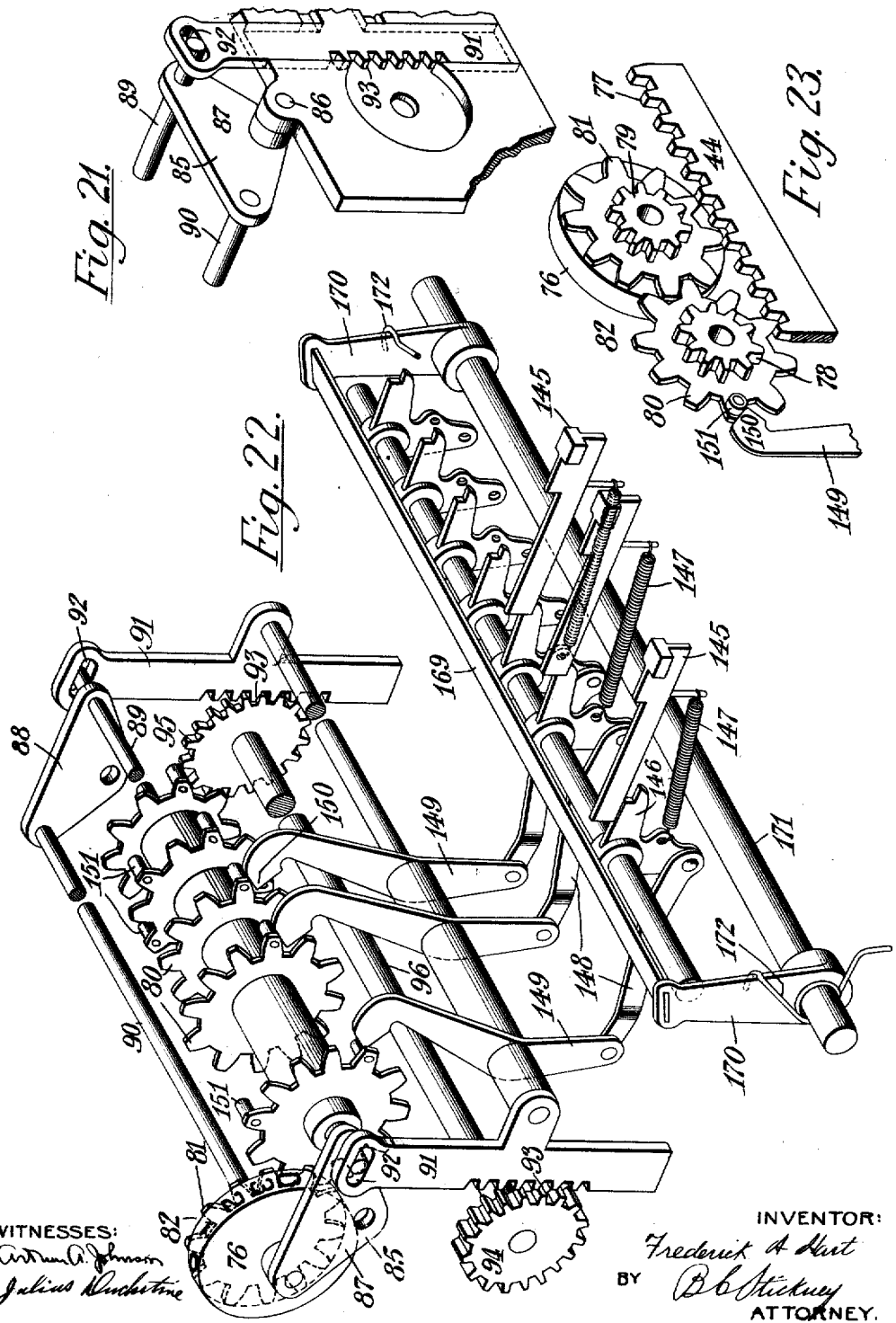

F. A. HART.
COMBINED TYPEWRITING AND COMPUTING MACHINE.
APPLICATION FILED JUNE 25, 1917.
1,338,014.
Patented Apr. 27, 1920.
10 SHEETS—SHEET 8.
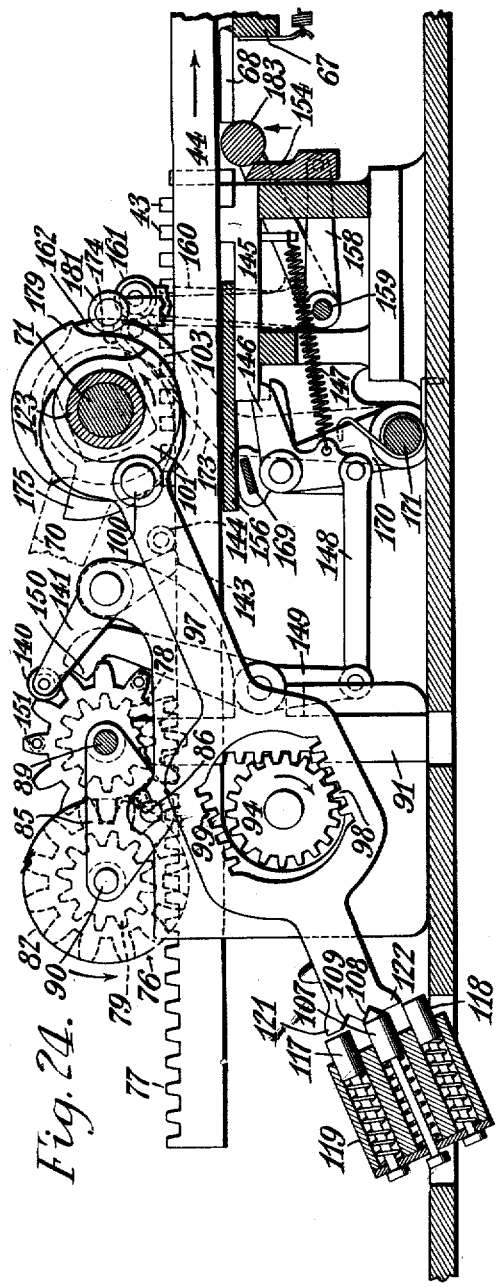
Fig. 24.
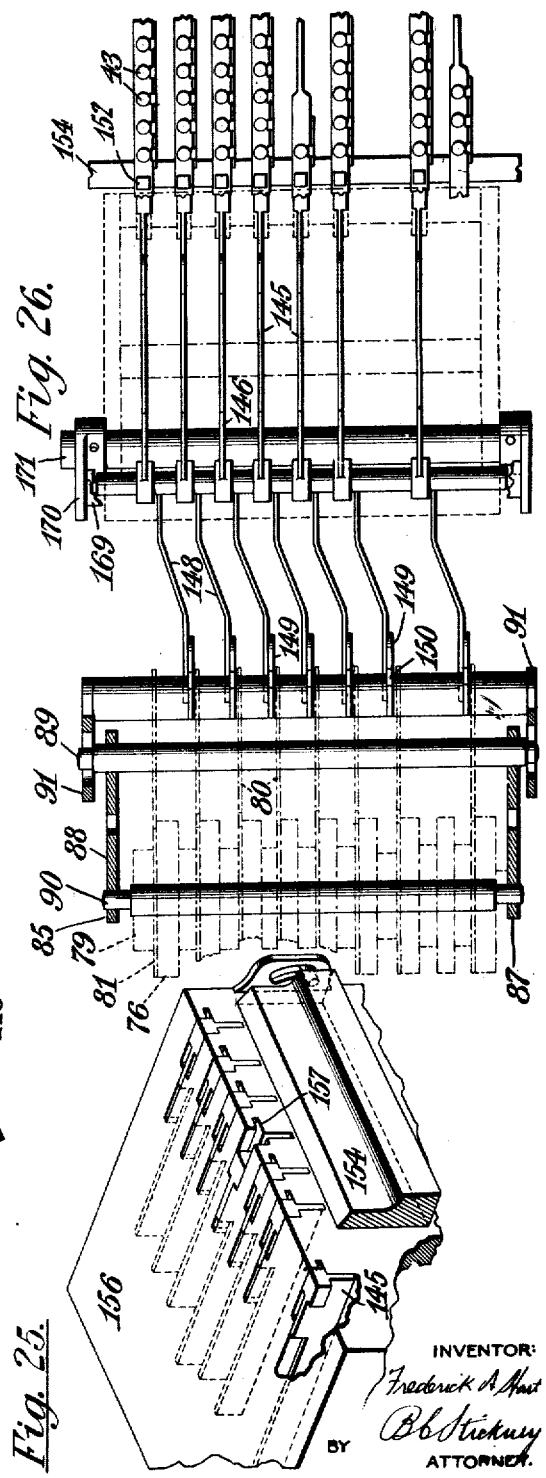
Fig. 26.
Fig. 25.
WITNESSES:
INVENTOR:
Frederick A. Hart
BY
ATTORNEY.

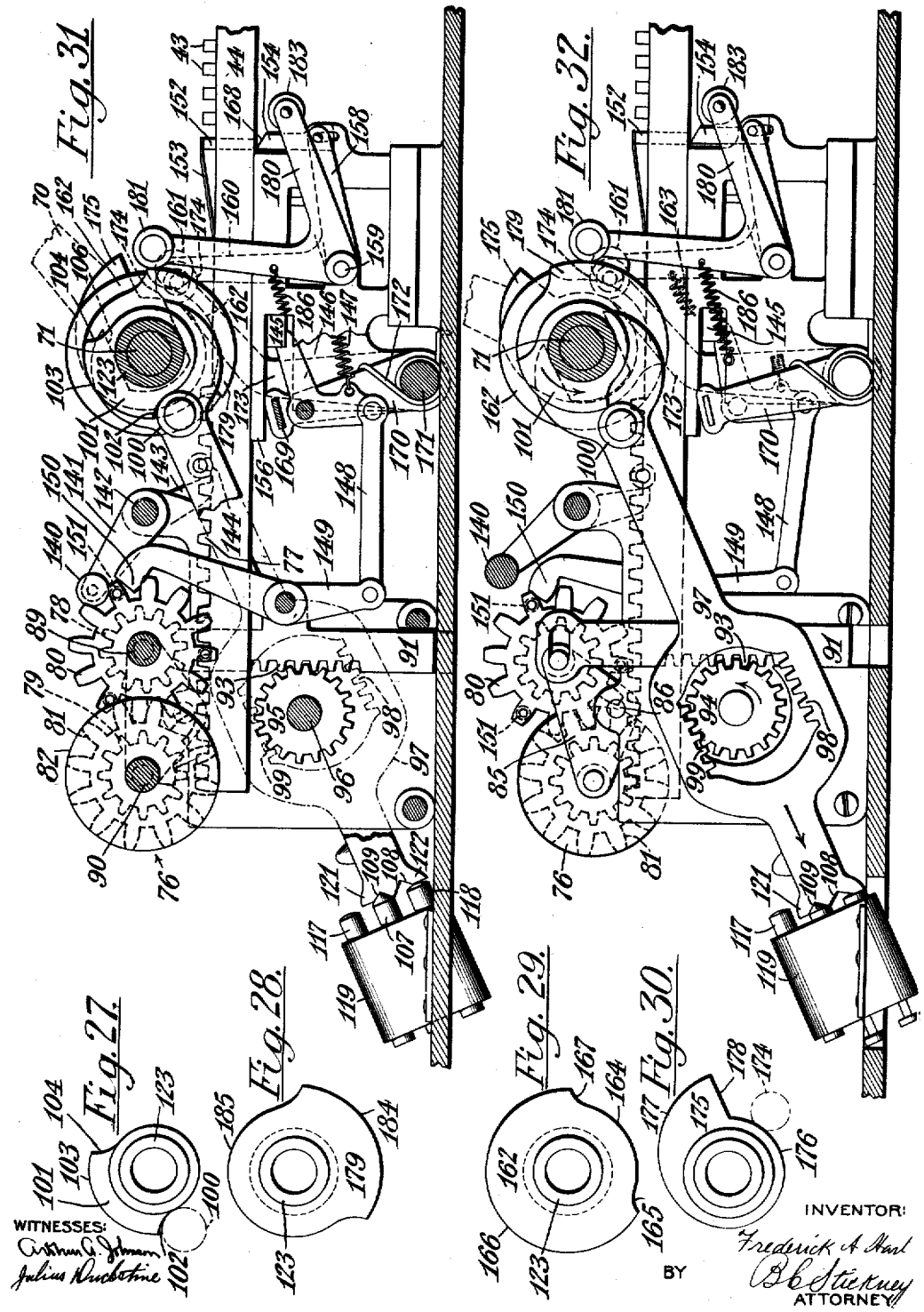

F. A. HART.
COMBINED TYPEWRITING AND COMPUTING MACHINE.
APPLICATION FILED JUNE 25, 1917.
1,338,014.
Patented Apr. 27, 1920.
10 SHEETS—SHEET 10.
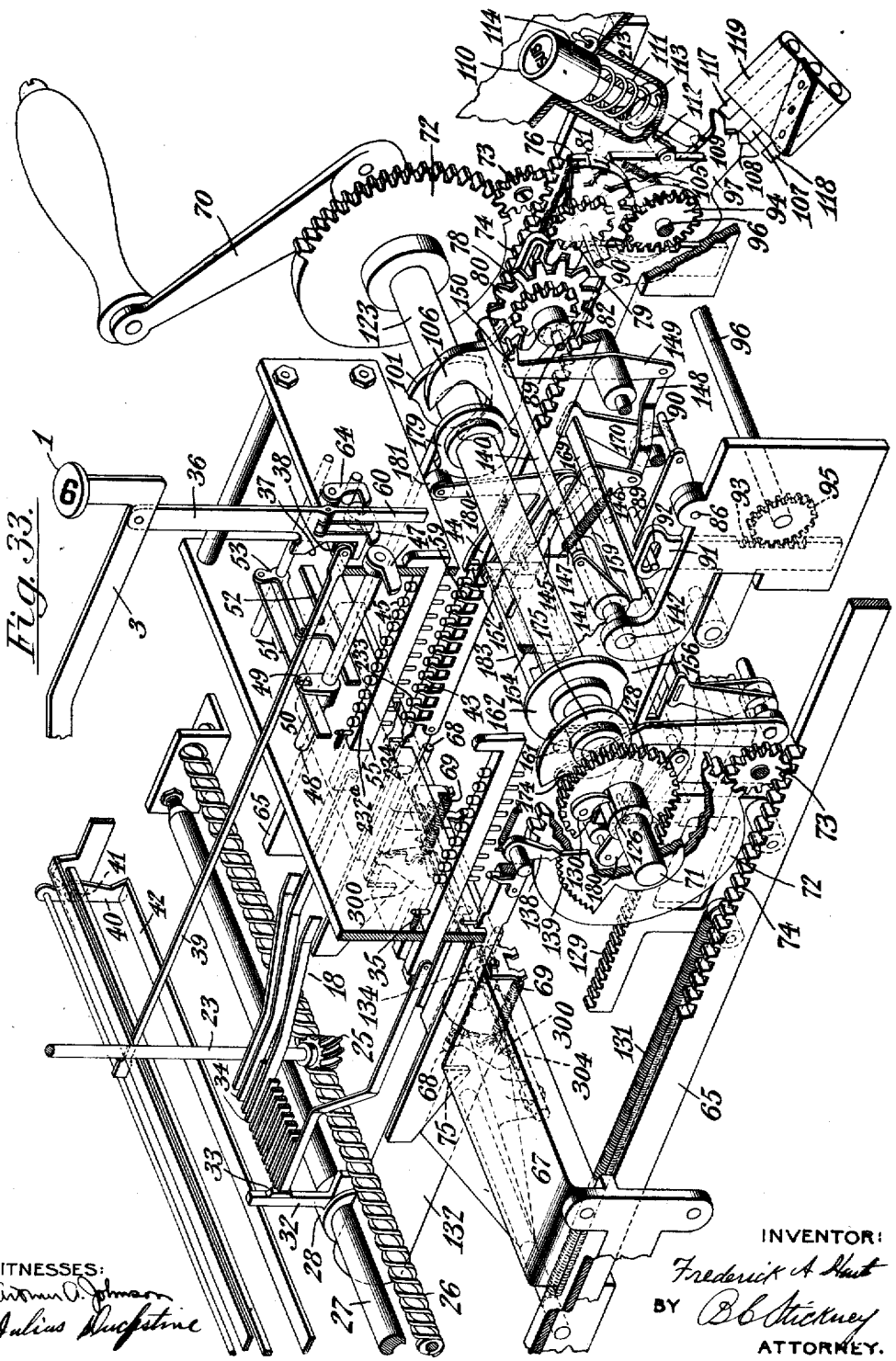
WITNESSES:
INVENTOR:
Frederick A. Hart
BY
ATTORNEY.

UNITED STATES PATENT OFFICE.

FREDERICK A. HART, OF NEWARK, NEW JERSEY, ASSIGNOR TO UNDERWOOD COMPUTING MACHINE COMPANY, OF NEW YORK, N. Y., A CORPORATION OF NEW YORK.

COMBINED TYPEWRITING AND COMPUTING MACHINE.

1,338,014.  Specification of Letters Patent.  Patented Apr. 27, 1920.

Application filed June 25, 1917. Serial No. 176,697.

*To all whom it may concern:*

Be it known that I, FREDERICK A. HART, a citizen of the United States, residing in Newark, in the county of Essex and State of New Jersey, have invented certain new and useful Improvements in Combined Typewriting and Computing Machines, of which the following is a specification.

This invention relates to a combined typewriting and computing machine, and is an improvement on my application No. 876,189, filed December 9, 1914 (now Patent No. 1,296,659, of March 11, 1919). The device in the application above-mentioned is adapted to compute decimally, while the present application is for computing in part nondecimally English money, that is to say, pounds, shillings, pence and farthings, so that while "sterling," "pence" and "farthings" are spoken of herein, these may be regarded as names for fractions having various denominators.

Generally speaking, the machine is of a type in which the digits are accumulated one by one and then run up in a group into the computing wheels. There are two sets of computing wheels for the set of dial wheels, either one of which may be brought into driving connection with the digit indexing or accumulating means, according to whether it is desired to add or subtract. In the present disclosure the pounds dial wheels are decimal. The tens of shillings dial wheel has but the digit "1" repeated five times at equal intervals. The units of shillings dial wheel is decimal. The tens of pence and units of pence dial wheels are joined so as to rotate as a single unit. This unit is a duo-decimal having ten digits from "1" to "10" with "11" and "0" besides. The farthings wheel is a duo-decimal having a cycle of "0," "1," "2," "3" repeated three times.

For the accumulating or indexing sterling amounts, changes in the number and arrangement of the indexing pins are necessary. In the present disclosure the denominational driving bars for the pounds dial wheels are provided with the usual nine pins, as the pounds orders are decimal. The other orders, where the exchange values to the next high order are different from decimal, have, in general, one pin less than the exchange value of the order. That is to say, the tens of shillings bar has but one pin, inasmuch as twenty is the exchange value from shillings to pounds and two is the exchange value from the tens of shillings to pounds; the units of shillings bar has nine pins as it is decimal; for the units and tens of pence dial wheel, which is rotated as a single element, there is but one bar having eleven pins, one less than twelve, exchange value from pence to shillings; the farthings bar has three pins, or one less than exchange value, four, from farthings to pence.

The setting of all accumulating or indexing pins is accomplished in said application indirectly by a series of linkages operated by the numeral keys "1" to "9." A series of interponent bars bearing interponent setting pins are provided, one for each digit column, excepting tens of pence. The pins on these bars are normally out of register with the pins on the denominational or driving bars, and the setting linkages. As the carriage travels from digit column to digit column, however, these bars are advanced, one by one, so as to enable the pins thereon to act as interponents between the setting linkages and the indexing pins, whereby the latter are set to the operative position by the former. These interponent bars have the same number of pins as the corresponding indexing bars, so that the setting of the index pins for all denominations, except the units and tens of pence, is easily understood.

Inasmuch as there is a printing action in the tens of pence digit column when ten or eleven pence is being computed, it is necessary to cause a control of the computing mechanism at this time. As there is but a single drive bar for units and tens of pence according to the present disclosure, the action must be done on this pence bar, which has eleven pins for both units and tens of pence computing columns. To do this, there is provided an eleven-pin interponent bar between the setting linkages and the single pence driving index bar, which may be termed the units of pence interponent bar. There is also provided an auxiliary tens of pence interponent bar. This bar is provided with a leverage mechanism having an extension normally out of register with any of the setting linkages, but capable of being brought into register with the "1" linkage operated by the "1" numeral key, when the latter is actuated in the tens of pence digit column, as in computing either ten or eleven pence. That is to say, this supernumerary interponent bar is advanced similarly to the other interponent bars when the carriage brings to the printing point that part of the work-sheet corresponding to a combined typewriting and computing action for the tens of pence digit column. Once this supernumerary interponent bar is advanced in this manner, an overhang on the lever mechanism will overlie the tenth pin on the units of pence interponent bar. When the "1" numeral key is operated, the overhang will actuate this tenth interponent pin, which in turn will set up the tenth index pin on the single pence driving or indexing bar, as the tenth interponent pin has an off-set normally in register with the tenth index pin. At the same time, this lever mechanism shifts a lug to a position in the path of a projection on the units of pence interponent bar. This enables the units of pence interponent bar, as it is advanced to an operative position when computing in the units of pence digit column, to likewise force the tens of pence supernumerary interponent bar forward with it, so that the lever mechanism on the latter will once more come within the range of the "1" setting linkage; but inasmuch as the units of pence bar is also in an advanced position, the overhang on the lever will project above the eleventh pin on the units of pence interponent bar instead of the tenth pin as previously. Now, if ten pence is being computed, the "0" numeral key will be operated, but inasmuch as there is no setting linkage corresponding to this key, there will be no setting of any of the pins and no operation of the leverage on the supernumerary interponent bar; but if eleven pence is being computed, the "1" numeral key will be operated in the units of pence column, so that the "1" setting linkage will actuate the leverage on the supernumerary bar, so as to operate the eleventh pin on the units of pence interponent bar, setting the eleventh pin on the single pence indexing or driving bar. It so happens in the present disclosure that the "1" linkage will also operate the first pin on the units of pence interponent bar, setting up the first indexing pin on the units of pence driving bar, but a guard is provided which is in operation up to the last units space of moving of the general operator which actuates the driving bars, so that this first pin will be restored to its normal ineffective position, preventing it from interfering with the computing action. Where eleven pence is computed this guard will also restore the tenth pin which is unnecessarily set under the circumstances.

The tens-carrying operation in the prior application is effected by added steps of movement of the drive bars which are normally obstructed against this extra movement by latch-held blocks in the path of the set pins on the drive bars. These latches are tripped from the computing wheels by means of tens-carrying rollers or teeth provided thereon. In the present application in the case of the pounds, units of shillings and pence computing wheels, there is but one tens-carrying roller, but in the case of the tens of shillings and farthings computing wheels, there are a number of these carry-over rollers; the tens of shillings having five as it completes a cycle five times in a revolution, while the farthings have three as it completes a cycle three times in a revolution.

Other features and advantages will hereinafter appear.

In the accompanying drawings,

Figure 1 is a skeleton view in elevation taken partly in section from front to rear, and showing the general relation of the typewriting mechanism to the computing mechanism.

Fig. 2 is a detail perspective view of a couple of the index pins on one of the denominational rack bars, showing one of the pins as set, and bringing out the means for locking the pins in their unset position.

Fig. 3 is a fragmentary view in side elevation partly in section, showing the relation of the interponent pins to the index pins on the denominational bars, and showing one of the interponent pins in its depressed position in the act of setting an index pin.

Fig. 4 is a perspective view of one of the special pins on one of the denominational rack bars which enables a carry-over operation when no index pin has been set up thereon.

Fig. 5 is a perspective view of the mechanism for setting pins on the pence computing bar when computing ten or eleven pence, with the aid of coöperating pin-bearing and lever-bearing interponent bars actuable in both the tens and units of pence digit columns.

Fig. 6 is a vertical section from front to rear through the computing casing, showing the general operator as started in its movement with the mechanism about to be shifted for an adding operation. This figure also shows an improved form of the mechanism for effecting a tens-carrying operation.

Fig. 7 is a reduced plan view showing the relation of the denominational rack bars or actuators to the computing wheels. This view also shows the variations in a number of pins on the several order bars corresponding to the different exchange values between several orders or denominations.

Fig. 8 is a detail perspective view showing the thrust links operated by the numeral keys, which in turn operate the setting and denominational selecting mechanism, and their relation to the latter as well as to the key lock.

Fig. 9 is a face view of some of the parts shown in Fig. 8.

Fig. 10 is a fragmentary view showing in dotted lines the starting position of the general operator handle, and in dot-and-dash lines the forward position, and the mechanism actuated thereby, whereby this oscillation of approximately one-third of a revolution, or 120 degrees, will effect a complete rotation of 360 degrees of some of the parts of the computing machine.

Fig. 11 is a sectional view through the driving pawl mechanism whereby the vibratory movement of the general operator handle gives a complete rotation to the general operator shaft.

Fig. 12 is a face view showing the several positions of the pick-up pawl illustrated in Fig. 11.

Fig. 13 is a detail view of one of the pick-up pawls.

Fig. 14 is a detail sectional view of the mechanism connected with the other of the pick-up pawls from that shown in Fig. 13.

Fig. 15 is a horizontal section showing the relation of the setting linkages to the denominational bars, and also of the denominational selecting mechanism to the denominational bars.

Fig. 16 is a detail vertical section showing one of the actuating denominational rack bars as having been moved forward with the "1" pin set, and without effecting a tens-carrying operation.

Fig. 17 is a view similar to Fig. 16, the mechanism, however, effecting a tens-carrying to a computing wheel in register with the rack.

Fig. 18 is a view similar to Figs. 16 and 17, with the exception that no pin is set corresponding to the striking of the "0" key in the denominational column according to its denominational member, but in which a carry over is being effected as having been initiated from the next lower in denomination computing wheel.

Fig. 19 is a vertical section showing the "1" pin as set on one of the denominational rack bars, and the various positions of the general operator handle at the start, at the end of the running-in of the number, which in this case is "1", and at the finish of the stroke after the tens-carrying springs have been tensioned if a tens-carrying operation has not been effected.

Fig. 20 is a view similar to Fig. 19, showing the parts in a position corresponding to the start in movement of the general operator, the various angular positions of the general operator handle corresponding to a return movement of the latter, showing the opposite rotations of different parts on the same axial center.

Fig. 21 is a skeleton perspective view of the shifting mechanism for bringing one or the other of the sets of the computing wheels into action for addition or subtraction.

Fig. 22 is a skeleton perspective view of the tens-carrying mechanism, showing the trip for the farthings computing wheel as being started into action. This view also shows that the farthings and pence wheels have twelve teeth instead of ten, with extra carry-over rollers on the farthings and tens of shillings computing wheels.

Fig. 23 is a detail perspective view, showing the tens-carrying mechanism in the act of being tripped by a computing wheel, and showing the computing wheels as disconnected from their actuating rack bar or denominational member.

Fig. 24 is a sectional view taken from front to rear, showing the general operator and the rack bars on their return movement and as disconnected from the computing wheels; also illustrating how the pins are restored to their normal positions.

Fig. 25 is a perspective view, showing the tens-carrying locks or obstructors, with one of the same (the fourth from the highest in denomination) in a position to permit a tens-carrying operation.

Fig. 26 is a fragmentary top plan view of the tens-carrying trips, showing how they are offset so that the lower computing wheels bring into play the tens-carrying mechanism for the next higher computing wheels.

Fig. 27 is a detail view of the cam which controls the shifting of the computing wheels for both addition and subtraction.

Fig. 28 is a detail view of the cam which controls the restoring of any of the index pins which may happen to be set.

Fig. 29 is a detail view of the cam which determines whether the special carry-over pins shall be effective for a carry-over operation or not.

Fig. 30 is a detail view of the cam which controls the restoring of the carry-over slides to their normal positions.

Fig. 31 is a detail view showing the mechanism set for subtraction and the general operator at the start of its forward stroke.

Fig. 32 is a view similar to Fig. 31, except that the general operator and its handle have advanced farther in their movement, and the computing wheels have been thrown into mesh with the rack bars for subtraction.

Fig. 33 is a skeleton perspective view showing the general relation of the more important parts of the computing mechanism.

Fig. 34 is a top plan view showing the relation of the tens of pence interponent bar to the units of pence interponent bar, when in their normal positions.

Fig. 35 is a vertical section, taken from front to rear, showing the parts illustrated in Fig. 34.

Fig. 36 is a vertical section, taken from front to rear, of the farthings interponent setting bar, showing that it has but three pins.

Fig. 37 is a similar view of the shillings interponent bar, showing that it has but one pin.

Fig. 38 is a similar view of either a pound interponent bar or the tens of shillings interponent bar, showing that they have nine setting pins.

Figs. 39, 40, 41 and 42 are detailed views, respectively, of the farthings, tens of pence, units of shillings or pounds, and tens of shillings computing wheels, showing the varying numbers of tens-carrying rollers for the different orders according to the number of times a cycle is repeated in a single revolution of the corresponding dial wheels.

Fig. 43 is a composite sectional view showing the relation of the computing and dial wheels, and showing the fact that the units and tens of pence dial wheels are fixedly united to rotate as a unit.

Fig. 44 is a developed view of the various dial wheels showing the different numbering of the same corresponding to the exchange values between the successive orders.

Referring briefly to the parts of the typewriting mechanism, which in the present instance is shown to be of the well-known Underwood type, numeral keys 1 (Fig. 1) and alphabet keys 2, depress key levers 3, to rock bell cranks 4, so as to swing type bars 5 up rearwardly against the front of a platen 6, mounted to rotate on a traveling carriage 7. The carriage 7 is given a step-by-step movement at the striking of any of the keys 1 and 2, by the traction of a spring barrel 8, under the control of an escapement mechanism indicated in general at 9. This escapement mechanism includes a rack 10, pivotally mounted on the carriage 7, and engaging a pinion 11, to which is connected an escapement wheel 12. The escapement wheel 12 is controlled in its rotation by pawls or dogs 13, mounted to be oscillated by a universal frame 14, which lies in the path of heels 15, one of which is provided on each of the type bars 5.

The numeral keys 1 in addition to performing typewriting actions, also operate computing mechanism indicated in general at 16 (Fig. 6). To do this, the computing mechanism brings into play a pin-setting mechanism, indicated in general at 17, and a denominational selecting mechanism, indicated in general at 18. The denominational selecting mechanism, which will be considered first, is for the purpose of according the denominations of the digits as printed by the typewriting mechanism, with the digits as set up for computation by the computing mechanism.

On the typewriter carriage 7 there is provided a rack 19 (Fig. 1), which meshes with a pinion 20 provided on a shaft 21, so as to rotate this shaft step by step with the step-by-step advancing movements of the carriage 7. The shaft 21 is provided with a bevel gear 22, so as to transmit the rotation of the shaft to a second shaft 23, through the intermediary of a second bevel gear 24. The shaft 23 is provided, at its lower end, with a 45-degree worm gear 25 (Fig. 6), which meshes to drive a worm 26.

Slidingly mounted on a shaft 27, parallel with the worm 26, there is provided a traveling selector 28, which has a tooth 29 engaging between the spirals of the worm 26, so that as the latter rotates, the selector 28 will be advanced step by step to correspond with the advancing movement of the carriage 7. The selector 28 is provided with an upstanding finger 32, having a tooth 33 arranged to engage individually the back ends of a series of interponent selector bars 34. The selector bars 34 are normally held by springs 35 in their inactive rearmost positions until a numeral key is depressed, when the selector 28 will advance whichever selector bar 34 it happens to be in register with, against the tension of its spring 35. The selector bars 34 are formed of two parts pivotally connected, and converge at their rear to correspond with letter-space movements of the selector 28, while being wide-spread at their front to correspond with the wide-spread relation of the computing wheels.

The selector 28, however, does not of its own initiative, perform the actual work of shifting the selector bars 34, but is actuated when a numeral key 1 is actuated. That is to say, the carriage 7 while it does the light work of shifting the selector 28 step by step, does not swing the selector 28 against the tension of the springs 35. The actual work of this movement is performed by the numeral keys 1 themselves.

Considering this phase of the question, each of the numeral keys 1 from "1" to "9" is provided with a downwardly-extending thrust link 36, which is provided with a cam shoulder 37 arranged to engage a follower roller 38 on a rearwardly-extending horizontal thrust link 39 (Fig. 6). The thrust link 39 is connected to rock a frame 40, pivoted at 41. This frame 40 may be termed a universal frame, in that it is universal to all positions of the selector 28 when in register with one of the selector bars 34. The universal frame 40 is provided with a universal bar 42, which when the frame is rocked will engage and rock the selector 28, to thrust before it the particular selector bar 34 which happens to be in register with the selector 28.

The purpose of this selecting action is to enable the pin-setting mechanism 17 to set any particular pin of a nest of pins 43, according to the numeral key actuated, and according to the denomination in which it is actuated. The pins 43 are arranged in rows on denominational members 44, which, as will be seen later, are also driving or actuating members, and are also arranged in transverse rows of pins of the same value. It will be noted by reference to Figs. 7 and 26 that the pounds and units of shillings bar have nine pins corresponding to one less than the decimal exchange value of ten; the tens of shillings bar has one pin corresponding to one less than two, the exchange value between tens of shillings and pounds; the pence bar has eleven pins corresponding to one less than the exchange value between pence and shillings which is twelve; and the farthings bar has three pins corresponding to one less than four, the exchange value from farthings to pence. The selector bars 34 carry corresponding series of setting or interponent pins 45, for the values "1" to "9" which, however, are normally out of register with the pins 43. The movement of any of the selector bars 34 against the tension of its spring 35 at the striking of a numeral key, will bring the pins 45 in alinement with or superposed relation to the pins 43, enabling the pin-setting mechanism 17, when operated, to set, through one of the pins 45, one of the pins 43.

To do this, each of the thrust links 36 has a foot or stem 46, arranged to engage an arm 47 on a rock shaft 48. There is one of these arms and rock shafts for each one of the numeral keys from "1" to "9". The rock shafts 48 are also provided with arms 49, arranged in order which engage and actuate linkages 50, which linkages comprise the usual upper and lower reaches 51 and 52 connected by arms 53, so as to move in parallel relation. Normally the pins 45 are out of alinement and therefore out of reach of the linkages 50, but when any one of the selector bars 34 is advanced in a denomination selection action, it brings the pins 45 within reach of the pin-setting linkages 50, and within striking distance of the index or valuating pins 43.

It will thus be seen that as a numeral key is struck, it will first rock the universal frame 40 to bring the particular selector bar 34 corresponding to the denomination at the printing point of the typewriting mechanism into play, so that the pins 45 thereon will lie between the pin-setting linkages 50 and the index or valuating pins 43. Then further downward movement of the numeral key will rock the associated shaft 48 to spread the pin-setting linkage 50, depressing the lower reach 52 thereof, so as to depress the particular pin 45 within range, which in turn will depress the particular pin 43 beneath it, as seen at Fig. 3. The particular pin 43 set will correspond in its distance from the front of the series of pins on the denominational member 44, with the value of the numeral key actuated.

The interponent setting pins 45 are normally held in a raised position by means of individual springs 54 (Fig. 3), which are inclosed in a guiding casing 55 for the pins 45, and engage a collar 56 provided on each pin. The downward position of the interponent or setting pins 45 therefore is but temporary, as they will return as soon as the pressure on the numeral key is relieved. The indexing pins 43, however, are held in their depressed position by spring-detent fingers 57, which also normally hold them in their raised position by engaging depressions 58 in the pins. For the purpose of simplifying the manufacture and reducing the cost, a series of the detents 57 are stamped and swaged from a single strip of metal 59, so that one detent member with its fingers serves a whole row of the index pins 43, and is secured in position on the associated denominational bar 44.

It will be noted by reference to Figs. 34 to 38 that the number of interponent setting pins 45 varies for the different orders with the number of indexing pins on the corresponding denominational drive bars beneath them. That is to say, for pounds orders and units of shillings orders there are nine interponent setting pins, while for tens of shillings, units of pence and farthings orders there are, respectively, one, eleven and three setting pins.

As stated above there is no tens of pence denominational drive bar and all of the driving and indexing for both the tens and units of pence digit columns must be accomplished by a single denominational bar which has eleven indexing pins settable thereon. Inasmuch as when ten or eleven pence is computed, the "1" numeral key is struck in the tens of pence column, use is made of this action for setting up the tenth and eleventh pins on the single pence denominational bar. To do this, there is provided an auxiliary interponent bar 225, Figs. 5, 34 and 36, in addition to the eleven-pin interponent bar. This auxiliary bar is similar to the bar 34 and is slidably mounted in the same frame and held in a rearmost position by one of the springs 35. When a numeral key "1" to "9" is actuated in the tens of pence digit column, then the selector 28 will advance the auxiliary bar 225 against its tension spring 35 to such a position that an extension 226 on a lever 227 will come beneath the pin-setting linkage 50 corresponding to and actuated by the "1" numeral key. When this numeral key is actuated, it will rock the lever 227 against a tension spring 228. This lever is pivoted intermediate its end on the auxiliary bar 225, at 229, and it engages and rocks a second lever 230 pivoted on the auxiliary bar. The second lever 230 is provided with a projection or overhang 231 which extends over the pins on the units of pence interponent bar 232 (Fig. 34).

Inasmuch as at this time the units of pence interponent bar is held in its rearmost inactive position by a spring 35, the overhang 231, which has been moved forward with the supernumerary bar 225, will overlie the tenth interponent pin indicated at 232ª, Figs. 34 and 35. When the compound lever is actuated in the manner just mentioned, this overhang will depress the tenth interponent pin 232ª, causing it to depress the tenth indexing pin 233 on the pence bar. This is possible as the pin 232ª is provided with an offset or foot 234, normally extending over the tenth index pin 233, when the units of pence interponent bar is in its normal rearmost position. All of the other setting pins on this bar are out of alinement with the corresponding indexing pins on the bar below, when the units of pence interponent bar is in its normal position. With the setting of the tenth pin 233, the compound lever engages and rocks a third lever 235 on the auxiliary bar 225, so as to bring a lug 236 thereon into the path of a projection 237, provided on the units of pence interponent bar 232. The lever 235 and its projection are yieldingly locked by a detent 238 in this position.

This mechanism is for the purpose of forming a means of connection between the units of pence interponent bar and the auxiliary or tens of pence interponent bar 225, so that the former may advance the latter with the actuation of the next numeral key, when the carriage has jumped to the next letter-space after the return of the "1" numeral key. This connection will only come into play, however, after the "1" numeral key has been struck in the tens of pence column corresponding to the computing of either eleven or ten pence.

We thus have at the actuation of the next numeral key in the units of pence column, both pence interponent bars in their advanced position. But the overhang 231 on the compound lever will now overlie the eleventh setting pin 239 on the units of pence interponent bar instead of the tenth pin. As the units of pence interponent bar has been advanced relatively to the pence drive bar beneath it, the eleventh setting pin 239 will now be in register with the eleventh indexing pin 240. This will enable the compound leverage, when actuated by the striking of the "1" numeral key, to set the eleventh pin 240. This will only occur, however, when eleven pence is being computed as when ten pence is being computed, the "0" numeral key is operated, which has no linkage operating on the computing mechanism, so that no indexing pin would be set at this time.

It will thus be seen that in computing ten pence, the tenth index pin on the single pence rack bar will be set up by the usual actuation of the "1" numeral key in the tens of pence digit column. It will be further seen that in computing eleven the "1" pin and "11" pin will be set on the pence bar. The highest, that is the eleventh, however, will determine the extent of driving movement of the pence rack bar as it is first engaged by the general operator. The other pins, that is, the first and tenth, will not interfere with the movement of the rack bar, as they are restored to normal position during the forward movement of the rack bar in the manner to be described. Inasmuch as in computing ten or eleven pence, the lever 235 is locked in its connecting position, it must be restored to its unconnecting position, so that if future computations of less than ten pence are made, it will not be in action. For this purpose, a projection, which may form the housing for the ball detent 238 on the tail 241 of the lever 235, when the lever is in its connecting position, will project in the path of a cam 242, provided on the pence rack bar, so that as the latter moves forward in running-up computations, it will force the connecting lever 235 back to its passive position, where it will be automatically held by the ball lock 238.

In order to prevent the stems or thrust links 36 from backing away, due to the camming action of the shoulder 37 on the follower 38, each link 36 is provided with an extension 60 which engages a bearing roller 61 (Fig. 6), which coöperates with arms 62 to guide the thrust link for vertical movement.

To prevent more than one numeral key from being operated at a time, each of the thrust links 36 is provided with an intruder 63 (Figs. 8 and 9), mounted for pivotal movement on the associated stems 36, and arranged to force itself between one pair of a series of pivotal locks 64. These locks 64 are so crowded together that they permit the insertion of but a single intruder 63, when all of the space through which they are permitted to swing will be taken up, whereby no further intruder connected to any other numeral key can be inserted between the members of the series of locks. Hence, no other numeral key can be depressed. The pivotal connection of each intruder 63 to its stem 36 permits the stems to move vertically, and yet allows for any canting due to eccentric swinging of the locking member 64.

It has thus far been shown how the index or valuating pins 43 are set up one by one and individually on the denominational members, so as to determine the extent of movement of these denominational members, which are also driving members. The index pins 43 thus set up represent the digits of the number to be computed and project below the denominational members 44, so as to lie in the path of a general operator 65, which is actuated to advance the denominational members 44 amounts corresponding to the particular pins 43 set.

The general operator 65 includes side plates 66, connected by a cross bar 67, which is provided with a series of plungers 68 in line with the denominational bars 44; and so positioned as to engage any set pins 43 on the bars. The plungers 68 are normally held in a projected position, as in Fig. 6, by means of tension springs 69 which are connected to levers 300 intermediate their ends. Each of the levers 300 extends into a reduced portion 301 provided in each of the plungers 68 and has a hook-shaped knife-edge pivot 302 engaging in a V-groove 303 provided in a bar 304 on the general operator. By this arrangement, the plungers 68, levers 300 and springs 69 can be readily assembled. It will be noted that each of the levers 300 is provided with a projection or foot 305 engaging the front side of an opening 306 in the general operator cross-bar through which the levers extend. This limits the forward position of the plungers accurately when drawn on by their springs 69. When the general operator moves forward, the plungers 68 engage whatever index pins happen to be set on the corresponding denominational drive bar 44. The springs are utilized to effect carry-over operations, as will be explained hereafter. The springs 69, however, are strong enough to permit the general operator 65 to force the bars 44 before it without stretching them until the final movement of the general operator.

The general operator 65 may be given its movement in any suitable manner, and in the present instance is shown to be driven from a hand crank 70, which moves through approximately one-third of a revolution, or 120 degrees, between the two dotted-line positions shown in Figs. 6 and 10, or, in other words, from the full-line position shown in Fig. 1 to the foremost position shown in dotted-lines in Figs. 6 and 10, and back again to the rearmost position. The crank 70 is secured to an inner shaft 71, on which is also secured a large mutilated gear 72, meshing to drive a gear 73 which meshes with a rack 74 provided on one of the side plates 66 of the general operator. The general operator 65, then, on the forward stroke of the crank 70, is advanced, carrying with it the denominational bars 44, which have pins 43 set thereon, and on the return stroke the rear edge of the cross bar 67 engages lugs 75 provided on the denominational bars 44, and returns them with it. The forward motion of the denominational bars 44 is used to drive the computing wheels of a computing register or totalizer 76, so that they will be rotated amounts corresponding to the pins 43 set up, and thus according with the numeral keys which have been previously struck. The arrangement is such, however, that the computing wheels may be selectively rotated in one direction for adding, and in the opposite direction for subtracting. To effect such a selective drive, the denominational bars 44 are provided at their front ends with racks 77, which may be made to drive directly either a series of gears 78 or a series of gears 79. When driving the former, the computing operation will be an adding one, and when driving the latter, the computing operation will be a subtracting one.

The gears 78 are each secured to a computing wheel 80, while the gears 79 are each secured to a computing wheel 81. The computing wheels 81 carry dial or number bearing wheels 82, which are arranged to exhibit their numbers through a sight opening 83 in a casing 84 (Fig. 6). The computing wheels 80 mesh with the computing wheels 81, so that if the gears 78 are in mesh with the racks 77, the forward computing wheels and their dial wheels 82 will also be rotated, the direction of rotation, however, being opposite from that when the gears 79 are in direct mesh with the racks 77. It will be noted in passing that the computing wheels for farthings and pence have twelve teeth as they are duo-decimal computing wheels. All of the other computing wheels have ten teeth as they are decimal computing wheels. In other words, it takes twelve units of drive for the pence and farthings wheels to make a complete revolution, whereas it only takes ten steps of movement to complete a revolution of the other computing wheels. The racks 77 have teeth corresponding to the computing wheels which they drive. The dial wheels 82 for the different orders have the digits printed on them to correspond to the exchange value of the orders. Those for pounds and units of shillings have each the digits in succession from "1" to "9" with "0." The tens of shillings has the digit "1" alternated by a blank space repeated five times. The units and tens of pence dial wheel has the digits from "1" to "11" with "0." And the farthings dial wheel has "1" to "3" with "0" repeated three times for the circumference of the wheel. This latter indicates that the farthings wheel completes three cycles when it completes one revolution.

To enable the alternative drive for addition or substraction, the gears 78 and 79 and the computing wheels 80 and 81 are mounted on a swinging floating frame 85 (Figs. 6, 21, 22, 24, 31 and 32), which rocks about an axial pivot 86, so as to alternatively shift from a neutral position, shown in Fig. 6, either the gears 78 into mesh with the racks 77 for an adding operation, or the gears 79 into direct mesh with the racks 77 for a subtracting operation as shown in Fig. 32.

The floating frame 85 (Fig. 22) may comprise side plates 87 and 88 supported by the pivotal axis 86, and connected by shafts 89 and 90, the former of which forms a pivot for the units comprising the gears 78 and the computing wheels 80, while the latter forms a pivot for the units comprising the gears 79 and the computing wheels 81. The shaft 89 may project beyond the side plates 87 and 88, so as to be engaged by the shifting mechanism, which brings about a meshing of either the gears 78 or the gears 79 with the racks 77.

This shifting mechanism may include a pair of rack bars 91, which have a slotted engagement 92 with the extensions of the shaft 89, and move in parallel relation so as to move the shift frame 85 evenly. The rack bars 91 are provided with racks 93, which are driven by gears 94 and 95 secured on a shaft 96. The gear 94 is of greater width than the rack bar 91 with which it meshes, so that it presents a sufficiently broad toothed surface to be engaged by a double rack bar 97 (Figs. 6, 24, 31 and 32), which is used to drive it alternatively in one direction or the other according as to whether an adding or a subtracting operation is desired. The double rack bar 97 encompasses the gear 94, and is provided with oppositely-facing racks 98 for addition, and 99 for subtraction, which may be alternatively meshed with the gear 94.

The double rack bar 97 is, in effect, then, a driver for the gear 94, and must be actuated before there is actually any driving movement of the denominational rack bars 44, so that the computing wheels will be in position to be driven at the time they are likely to be driven. For this purpose, the distance between the plungers 68 and the highest pins 43 is sufficient to permit an idle movement of the general operator relative to the driving rack bars 44, which will be taken up in shifting the floating frame 85 to bring about a driving relation of either set of computing wheels with the racks 77.

The double rack bar or driver 97, which effects the shifting, is operated at the beginning of the forward stroke of the general operator 65. For this purpose, it is provided with a follower 100, which is engaged and driven by a cam 101 (Figs. 27 and 31). The cam 101 has a steep rise 102, which comes into engagement with the follower 100 at the very first portion of the stroke of the crank 70 corresponding to the first part of the movement of the general operator 65, and will instantly force the follower 100 out on to a dwell portion 103 of the cam 101, which is concentric with the axis of rotation of the cam 101. This movement is sufficient to shift the frame 85 in one direction or the other for a complete meshing of the gears 78 or 79 with the racks 77.

The dwell portion 103 is just a little less than one-third of a circumference, so that the driver 97 will be advanced to actuate the gears 94, 95, and shift the rack bars 91 to bring about a driving relation between the computing wheels and the racks 77 at the first part of the forward movement of the hand crank 70 and the general operator 65, and will maintain the driving relation until just after the termination of the forward stroke of the general operator 65 and the hand crank 70, when the follower 100 will move back at a dip 104 provided beyond the dwell portion 103 of the cam 101.

Before considering the further movement of the cam 101, it will be shown how the driver 97 is made to mesh either its rack 98 or its rack 99 with the gear 94, so as to effect either an adding shifting, as in Figs. 6 and 24, or a subtracting shifting as in Figs. 31 and 32. Normally the driver 97 is held by a spring 105 in the position shown in Fig. 6, with the adding rack 98 in mesh with the gear 94, the driver 97 having a sliding fulcrum by being forked at 106 to encompass the shaft 71. The other end of the driver 97 is yieldingly held in one position or the other by a cushion detent 107, whose apex engages alternatively in one or the other of a pair of notches 108 and 109 in the driver 97. When in an adding position the notch 108 of the driver is engaged by the cushion detent 107, and when in a subtracting position, the notch 109 is engaged by this detent.

To shift from the adding position shown in Fig. 6 to the subtracting position shown in Fig. 32, there is provided a subtraction key 110, which may be depressed against the tension of a spring 111 to depress the lower end of the driver 97 against the tension of its spring 105. The subtraction key 110 will be caught in its depressed position for one computing operation, by a latch 112, which engages a notch 113 provided in the stem of the subtraction key 110. If the subtraction key 110 should be held depressed for a number of subtracting operations, a special lock 213 (Fig. 6) may be swung into position to engage a slot 114 provided in the subtraction key 110. When the subtraction key 110 is depressed, it lowers the driver 97 from a position in engagement with a stop 115, to a position in engagement with another stop 116, when the rack 99 will be brought into mesh with the gear 94.

As the cam 101 rotates to slide the driver 97 downwardly, not only the cushion detent 107 yields to permit this movement, but also one of two other cushioning members 117 and 118 (Fig. 24 comes into play to enable a subsequent return movement of the driver 97, when the follower 100 slips off the dwell portion 103 of the cam 101. It will be seen by reference to Fig. 24, that the cushioning members 107, 117 and 118 are in the form of spring-pressed plungers which recede into a casing 119 before the oncoming driver 97, and serve to return the same when the follower 100 has escaped the cam 101. The plungers 117 and 118 are alternative in their action according to the position of the driver 97 for an adding or a subtracting operation.

At almost the very end of the forward movement of the driver 97, the latch 112 is tripped by a pin 120 on the driver 97 engaging the same. The driver 97, however, is not permitted to unmesh with respect to the gear 94, as a lug or extension 121 will engage under the cushion 117 (Fig. 32), which forms in this way a guide lock. In other words, the driver 97 cannot escape from the gear 94 until it has returned it, the shifting frame, and the computing wheels manipulated thereby, to a normal neutral position.

In a similar manner in an adding shifting, the other cushion 118 is engaged by a foot 122 on the driver 97, which prevents the unmeshing of the rack 98 with the gear 94, in case of an erroneous operation of the subtraction key 110 while the general operator is in motion.

While the hand crank 70 vibrates back and forth for one complete reciprocation of the general operator 65, it is not desirable to have the cam 101 vibrate in this manner, it being preferable to have the same operate the driver 97, then escape therefrom, and finally complete a revolution to its normal position ready for a subsequent operation, that is to say, it is desired to have the cam 101, and, as will be seen hereafter, certain other parts, effect a complete revolution of 360 degrees while the hand crank 70 is moving forwardly and backwardly through an arc of about 120 degrees. To effect this motion, the cam 101 is not secured directly to the shaft 71, to which the hand crank 70 is secured, but is mounted on a sleeve 123 which is coaxial with the shaft 71.

To effect the drive of the sleeve 123 for a complete rotation during a back-and-forth vibration of the hand crank 70, the gear 72, which, it will be remembered, is secured to the shaft 71, is provided with a driving pawl 124 (Figs. 11, 12 and 13), which is normally held by a spring 125 in engagement with the shoulder of a notch 126 provided in the sleeve 123. The pawl 124 and the notch 126 are normally in register with each other when the hand crank 70 is at its normal starting position. As the hand crank 70 moves from the 70ª position (Fig. 10) to the 70ᵇ position, the pawl 124 advances from the full-line position (Fig. 12) to the dotted-line position indicated specifically at 124ᵇ (Fig. 12). That is to say, during the third of a revolution of the hand crank 70 for the forward stroke of the general operator, it carries with it the sleeve 123 and all parts mounted thereon, one-third of a revolution and leaves it there. During the return stroke of the hand crank 70 and the general operator 65, the pawl 124 escapes out of the notch 126 and returns to its full-line position. The sleeve 123, however, is picked up and carried on farther for the remaining two-thirds of a revolution. This is accomplished by providing a pick-up 127, which is mounted loosely on the sleeve 123 to rotate about the same axis as that of the shaft 71. The pick-up is provided with a gear 128, which meshes with a rack 129 (Fig. 10) carried by one of the side plates 66 of the general operator 65.

It will be seen that as the general operator 65 moves forwardly in the direction of the arrow in Fig. 10, it will rotate the gear 128 in the direction of the arrow thereon, which is opposite to the direction of rotation of the mutilated gear 72. The ratio of gearing between the mutilated gear 72 and the general operator 65, and from the general operator 65 to the rack 129 and to the gear 128, is such that the gear 128 will rotate twice as fast as the gear 72, and in the opposite direction.

The pick-up 127 in addition to the gear 128, is provided with a pawl or dog 130, which, when the hand crank 70 is at its initial starting position, corresponding to 70ª (Fig. 10), will line up with the pawl 124 carried by the gear 72. It will be seen, however, that this pawl 130 moves backwardly with the gear 127 through two-thirds of a revolution, while the pawl 124 is advancing one-third of a revolution with the gear 72, so that the pawls 124 and 130, from a starting position in register with each other in the notch 126, which is wide enough for both pawls, will, at the end of the forward stroke of the hand crank 70, correspondingly to the position 70ᵇ, once more be in register with each other at the position indicated at 124ᵇ (Fig. 12), both again in the notch 126. On the return stroke, however, of the general operator and the crank 70, the pawl 124 trips idly over the sleeve 123, while the pawl 130 takes up the work of advancing the sleeve 123 through the remaining two-thirds of a revolution, which will be accomplished during the return stroke of the general operator through the rack 129 and the gear 128.

The sleeve 123, then, has a comparatively slow advance of one-third of a revolution for the forward stroke of the general operator 65 and the hand crank 70, and a quick further advance of two-thirds of a revolution for the return stroke of the general operator 65 and the hand crank 70, giving in all one complete revolution of the sleeve 123 and the parts carried thereby, which includes the cam 101.

The return movement of the general operator 65 may be effected, if desired, by one or more springs 131 (Figs. 10 and 15), thereby insuring the return to a normal position. The return movement may be cushioned by means of a retarder 132, which permits a quick initial return movement for the greater part of the stroke, and a slow final movement, so as to surely take up the jar. This may consist of a piston 133 secured by its rod 134 to the general operator 65, and sliding in a cylinder 135. The cylinder is provided with a number of outlets 136, so that the air entrapped by the piston 133 for the first part of the return stroke thereof, can pass out quite freely, permitting the springs 131 to act quite rapidly. After the piston 133, however, passes the openings 136, a considerable amount of air is entrapped behind the piston which may pass out but slowly through a single aperture 137, so that while the complete return movement will be assured, the final portion thereof will be comparatively slow and cushioned to avoid jarring of the machine. Any full-stroke mechanism may be provided for insuring complete movements of the general operator and the hand crank 70, such as a two-way-acting spring pawl 138 (Fig. 6), which engages a sector ratchet 139 secured to the shaft 71.

Each of the computing wheels is prevented from rotating idly, when not actually driven, by a detent roller 140 (Figs. 6 and 31), which normally engages between the teeth of the rear computing wheels 80. This detent roller 140 is mounted on a swinging frame 141, pivoted at 142, and having an arm 143 lying in the path of a pin 144 on the driver 97, so that as the driver moves downwardly to effect a shifting of the computing wheels for an adding or a subtracting operation, the detent 140 will be moved to a silent position. It will return, however, as soon as the gears 78 and 79 are moved out of mesh with the rack 77.

If a computing wheel passes through zero, it is necessary to effect a carry-over operation to the next higher computing wheel. This is done in the present instance by the rack bars 44 themselves, through the aid of the general operator 65. If a pin 43 is set up, the action is simple. Normally, when no tens-carrying operation takes place in connection with one of the bars 44, the bar moves a distance corresponding to the particular pin set, and to the numeral key having been struck to set such pin. If, however, a carry-over is to be effected through the accordant computing wheel, such rack bar moves an additional step to effect this carry-over operation.

In front of the row of pins 43 on each bar 44, there is provided a locking or blocking slide 145, which normally obstructs the movement of a pin 43 and its bar 44 beyond that accordant with the value of the numeral key which set it. The plungers 68, however, project to such a distance that by the time a set pin comes into engagement with its slide 145, the general operator 65 has not quite completed its forward movement, so that it is necessary to tension the spring 69 for a distance between two of the pins 43. If, however, a slide 145 is permitted to recede before the oncoming pin 43, then the spring 69 will not be tensioned, but will advance the associated rack bar 44 an added step for a carry-over operation, which added step will be transmitted into a rotation of the associated computing wheel either forwardly or backwardly according to the character of computation. The slides 145 are normally held against a receding movement by means of a latch 146 (Figs. 31 and 32), of which there is one for each of the slides 145.

It will be noted in passing that the bar 44 for the farthings computing wheel does not have a slide 145 nor a latch 146, as there is no carry-over to be effected to it or its computing wheel, there being no computing wheel lower in denomination.

Each latch for a denominational member 44 is controlled from the computing wheel of next lower denomination. For this purpose, the latches 146, which hold the slides 145 against a forward movement under the pull of their springs 147, are connected by links 148 to starting trips 149 (Figs. 22, 24, 31 and 32). The springs 147 effect the double purpose of operating the slides 145, and holding the latches 146 in their locked position.

The links 148, as will be seen by reference to Figs. 7 and 16, are warped, so that each starting trip may be operated by a computing wheel of lower denomination while controlling a slide 145 of next higher denomination. The upper end of each trip 149 is beveled in both directions at 150 (Fig. 22), so as to be forced outwardly by a starting or carry-over member 151, in the form of a roller, located at suitable points in the periphery of each of the computing wheels in the series 80. This enables the trips 149 to be actuated whether the computing wheels are rotated for addition or subtraction, as any computing wheel completes a revolution, so that the carry-over mechanism is brought into play in the same manner for both addition and subtraction. Inasmuch as the tens of shillings computing wheel repeats a cycle five times in a revolution, it is provided with five of the carry-over members 151, located at the proper intervals thereon (Fig. 22). The farthings computing wheel completes a cycle three times in a revolution, so that it is provided with three of the carry-over members 151 in order to enable a carry-over operation each time four farthings has been completed to carry a pence to the pence wheel.

It is thus evident that when any of the index pins 43 is set on a denominational member 44, this denominational member can effect an added step of movement to its computing wheel whether adding or subtracting, when the next lower computing wheel completes a revolution. Such an action is plainly shown in Figs. 16 and 17 where the "1" pin is set, the carry-over action being started in Fig. 16, and finished in Fig. 17.

It is necessary, however, to effect such carry-over operation also in cases where no index pin 43 is set on a denominational member, as in the case where "1" is carried to a computing wheel having no digits run in by its rack bar 44, corresponding to the striking of the "0" key.

To enable such carry-over operations, there is provided on each of the denominational bars 44 of higher value than the units bar, a special carry-over pin 152, which is located one step in advance of the "1" index or valuating pin 43, so as to correspond to an added rotation of one-tenth of a revolution of the computing wheel associated with a denominational bar 44 bearing the same. This special carry-over pin 152 (Figs. 31 and 32) normally tends to assume a depressed or set position (Fig. 18) under the propulsion of a spring 153, of which there is one for each carry-over pin. The carry-over pins 152, however, are held in their raised position by a timing guard 154 (Figs. 24 and 30), which is universal to all of the carry-over pins 152. The guard 154 holds the pins 152 high enough so that if a rack bar 44 moves forwardly, due to the general operator engaging any other set pin from "1" to "9," the carry-over pin 152 on this bar will ride on top of the associated slide 145, as in Figs. 16 and 17. In order to insure this riding, the carry-over pins 152 are formed, as shown in Fig. 4, with a laterally-projecting foot 155 forming an extensive surface overlapping all exposed slots in the upper surface of a guiding block 156 in which the slides 145 reciprocate.

The carry-over pins 152, then, do not interfere with the normal driving operation of the bars 44 in running up digits into the computing wheels corresponding to the particular index pins 43 set up on these bars; nor do they interfere with carry-over operations effected by said index pins. If, however, no index pin should happen to be set on a denominational bar 44, as the general operator approaches the end of its forward stroke, the particular plunger 68 corresponding to this denominational member 44 will engage the carry-over pin 152, and tend to force the same forward together with the rack bar 44, the pin 152 having in the meanwhile come down into the path of its associated plunger 68. If, however, the latch 146 for this particular denominational bar has not been tripped by a complete rotation of the next lower computing wheel, the spring 69 will merely be tensioned without advancing the associated rack bar 44. If, on the other hand, the next lower computing wheel has passed through zero, the slide 145 will have been released, so that the carry-over pin 152 will be permitted to travel forward in the socket of its slide, which has receded before it, thereby permitting the spring 69 and the plunger 68 to advance the rack bar 44 one step at the last portion of the forward stroke of the general operator 65. This action is shown in Fig. 18.

As will be seen by reference to Fig. 25, the slideways or sockets for the slides 145, are provided with additional lateral cavities 157, to allow for the laterally-extending feet 155 of the carry-over pins 152.

It has been stated above that the guard 154 normally holds the carry-over pins 152 in their raised position clear of the plungers 68, but that these pins are permitted to come into the path of movement of the plungers 68 near the end of the forward stroke of the general operator 65. This action is accomplished by mounting the guard 154 on a swinging frame 158 (Figs. 19, 20, 24, 31 and 32), so as to have a vertical up-and-down movement as the frame swings.

The frame 158, which is pivoted at 159, includes an arm 160 having a follower roller 161, which is held in engagement with a cam 162 (Fig. 29) by means of a spring 163. The cam 162 has a depressed dwell portion 164, in engagement with which the follower 161 is maintained during the major portion of the forward stroke of the general operator 65, the cam 162 being mounted on the sleeve 123, which, it will be remembered, is rotated one-third of a revolution during the advancing stroke of the general operator, and a further two-thirds of a revolution in the same direction during the return stroke of the general operator.

As the general operator completes a forward movement after the crank has traveled from 70ᵃ to 70ᶜ (Fig. 19), then a rise or cam incline 165 forces the follower 161 outwardly abruptly, thereby causing the frame 158 to rock to withdraw downwardly the guard 154, thus permitting the springs 153 to act to project any such of the carry-over pins 152 as may not as yet have been slid over the top of the slides 145, down into the path of the associated plungers 68, so that they may be engaged by the latter to advance the associated rack bars 44 one step during the remaining portion of the forward movement of the general operator (Fig. 18). This will occur, of course, only when a denominational bar 44 has had no index pin 43 set up thereon. At all other times, the guard 154 remains in its upper position so long, that the engagement of the general operator with any of the set pins 43 will advance the carry-over pin 152 to an ineffective position resting on top of the associated slide 145 and the block 156.

The cam 162 has a dwell portion 166 at its upper level on which the follower roller 161 remains for most of the return stroke of the general operator, including the last two-thirds of a revolution of the sleeve 123, and in fact, until the very last portion of the return stroke of the general operator, when the pins 152 have already had a chance to be once more brought above the guard 154 clear of the slides 145, when the cam roller 161 will drop onto the lower level 164, by means of a dip 167. The guard 154 is beveled at 168, so that if perchance any index pin 43 of lower value than the pin engaged by the general operator 65 in the act of driving, should be set accidentally, it will be cammed up to an unset position during the forward movement of the associated bar 44, so as not to engage a slide 145 and interrupt the movement of the general operator.

It will be noted in passing that at the end of the forward stroke of the general operator 65, all the springs 69 which have not effected a carry-over operation, are under a compression, so that a series of successive carry-over operations from lower to higher denominations of adjacent computing wheels, can be effected even after the general operator has reached the end of its forward stroke.

As the general operator returns, it is necessary to re-prime or re-set all of the carry-over locking slides 145 as may have been tripped to permit carry-over operations. To do this, there is provided a restoring or resetting rail 169 (Figs. 22, 31 and 32), which is universal to all of the slides 145, and is arranged to engage them at their tail ends. The rail 169 is mounted on a frame 170, pivoted at 171, and is normally held out of engagement with the slides 145 by a spring 172. The universal rail 169, however, is swung rearwardly during the return stroke of the general operator, by means of an arm 173 connected to the frame 170, and having a follower 174 engaging a cam 175 (Fig. 30) secured to the sleeve 123, which, it will be remembered, has a complete rotation during the reciprocation of the general operator.

The cam 175 has a dwell portion 176 for the major portion of its circumference, which is in engagement with the follower roller 174 during the forward stoke of the general operator and for some portion of the return stroke of the general operator, but is provided with a gradually-inclined rising cam surface 177, which forces the follower roller 174 outwardly, and thereby causes the universal rail 169 to gradually tension all of the springs 147 as may have collapsed in a carry-over operation, by returning the slides 145 to their obstructive positions, and lock them in such positions by their associated latches 146. At the end of the return stroke of the general operator 65, the follower roller 174 drops off the raised portion 177 of the cam 175, by means of a dip 178, through the aid of the spring 172, so as to return to the lower level 176. This will carry the rail 169 clear of the slides 145, so that they may be freely tripped for a subsequent tens-carrying operation.

After the set index or valuating pins 43 have fulfilled their function of determining the extent of movement of the bars 44, it is necessary to restore them to their unset position to enable subsequent computations to be set up in the nest of pins. This is done on the return stroke of the general operator. The sleeve 123 has a cam 179 (Fig. 28) which controls the movements of a pin-restorer 180. This pin-restorer 180 includes a follower 181 which engages the cam 179, a bell crank 182 on which the follower 181 is mounted, and a pin-restoring roller 183 which lies transversely of the bars 44 in subjacent relation thereto. On the forward stroke of the general operator, the pin-restoring roller 183 is held clear of the set pins 43 by the outer or upper level 184 of the cam 179. By the time the general operator starts to return, however, the follower 181 will have dropped onto the lower or inner level 185 of the cam 179, thereby permitting a spring 186 to raise the restoring roller in back of the row of set pins which have advanced at least up to the slides 145, and in some instances where tens-carrying has taken place, into the guideways of the slides.

As soon as the general operator, by the engagement of the cross bar 67 with the lugs 75, returns the bars 44, the pins 43 will roll up on the restoring roller 183 and be projected to their uppermost unset positions. On the subsequent forward stroke of the general operator, before any of the set pins 43 can have been advanced to the range of the restoring roller 183 the latter will have been depressed clear of the path of the set pins.

The operation can best be considered by illustrating the same with an example. We will assume that the totalizer or computing head already registers 19 pounds, 13 shillings, 1 pence, 2 farthings, which amount may have been previously run into the same. It will also be assumed that the amount 30 pounds, 7 shillings, 11 pence, 3 farthings, is to be added to the number already registered in the computing head. The carriage 7 from its starting point at the extreme right, is advanced by the tabulating mechanism or in any other suitable manner, until the proper letter-space corresponding to the tens of pounds column comes into register with the printing point of the typewriting mechanism. The denominational selection for the computing mechanism will be automatically accorded with the denomination of this digit column, by the train of gearing 19 to 25 automatically rotating the worm 26, so as to position the selector 28 synchronously with the positioning of the carriage 7. Thus the selector 28 will be brought with its upstanding finger 32 in register with the selector bar 34 (sixth from the bottom in Figs. 7 and 15), which is the tens of pounds selector bar.

The numeral key "3" may then be struck to print the digit "3" on the work-sheet on the platen 6. At the same time, the thrust link 36 will be depressed so that the cam 37 will, through the link 39 and the universal actuating frame 40, rock the selector 28 to advance the tens of pounds selector bar 34. This will bring all of the interponent pins 45 from an idle position to a position between the setting linkages 50 and the index pins 43 on the tens of pounds denominational driving bar 44. As the key "3" continues to descend, it will lock all other keys from being actuated, by actuating the locks 64, and will also rock the shaft 48 for the pin-setting linkage 50 corresponding to "3". This will set up the third index pin 43 from the front of the tens of pounds bar 44, which will be held in its set position. As the numeral key "3" returns, the selector bar 34 for the tens of pounds denomination will be returned by its spring 35, and the linkage 50 actuated by this numeral key will also return to a passive position.

The same return movement permits an escapement of the carriage 7 to the next letter-space or digit column. This movement of the carriage will be transmitted so that the selector 28 will advance in the opposite direction a corresponding amount so as to come into register with the units of pounds denominational selector bar 34, that is, the fifth one from the bottom (Figs. 7 and 15). The "0" numeral key will then be struck to print "0", but inasmuch as this requires no registration in the computing mechanism, the "0" key is unprovided with a thrust link 36 and actuating mechanism. The computing mechanism will hence be idle in this particular denominational column.

The return of the "0" key will space the carriage 7 once more, and together with it the denominational selector 28 which will come into register with the denominational bar 34 for the tens of shillings column, the fourth one from the bottom (Figs. 7 and 15). The space-key of the typewriting mechanism must be struck in this column as there is no tens of shillings being added in the sum taken as an example. The spacing of the carriage also spaces denominational selector 28, so that the units of shillings interponent bar 34 will be advanced to bring the interponent pin thereon into register with the setting linkages and the indexing pins. Inasmuch as seven shillings is to be added, the "7" key is struck, printing "7" and setting up the "7" pin on the units of shillings bar 44. With the return of the numeral key, the carriage is spaced, bringing the selector 28 into register with the tens of pence special interponent bar 225. If anything less than ten or eleven pence were to be added, no numeral key would be operated at this time, but inasmuch as eleven pence is to be added, the "1" numeral key is operated.

When the special interponent bar 225 is in its advanced position, the extension 226 will be in register with the "1" numeral key-setting linkage. At the same time the overhang 231 will be in register with the tenth pin 232ª on the units of pence interponent bar. This tenth pin is normally in operative relation with the tenth pin on the pence drive bar, so that the actuation of the numeral key will set up this index pin. The same movement shifts the connecting lever 235 to a position such that its lug 236 will lie in the path of the projection 237 on the units of pence interponent bar. As the numeral key "1" returns to its normal position, the carriage spaces, causing the selector 28 to come in register with the units of pence interponent bar. With the actuation of the next numeral key, which will be the "1" numeral key, inasmuch as eleven pence is being computed, the units of pence interponent bar will be advanced, carrying with it, however, by reason of the parts 236—237, the tens of pence interponent bar. This brings the extension 226 in register with the "1" setting linkage, and the interponent pins in register with the index pins on the pence rack bar. The continued movement of the "1" numeral key will operate the compound lever, causing the overhang 231 to actuate the eleventh pin 239 with which it is now in register, which pin will set the eleventh index pin 240 into register with which it has been brought by the initial movement of the numeral key.

The return of the numeral key will cause the carriage to space, and bring the selector 28 in register with the farthings interponent bar, which will be advanced at the striking of the "3" numeral key to add three farthings, so as to bring the setting pins thereon in register with the index pins on the farthings rack bar, enabling the setting of the third index pin on this latter bar.

We now have the complete number 30 pounds, 7 shillings, 11 pence and 3 farthings set up in the nest of pins 43. The general operator may be now actuated by pulling forward the crank 70. At the very beginning of the advanced movement of the crank 70 from "x" to "y", indicated in Fig. 20, the cam 101 forces, by means of its rise 102, the follower 100 out onto the outer circle or dwell portion 103. Inasmuch as the addition and subtraction bar 97 is in its adding position, (Figs. 1 and 24), the gears 94 and 95 will be rotated in the direction of the arrow in Fig. 24, depressing the rack bars 91, so as to bring the gears 78 into mesh with the racks 77 on the denominational bars 44. This will enable the bars, when advanced, to rotate the dial wheels 82 for addition. There is sufficient lost motion between the plunger 68 on the general operator and the set index pins 43 to permit the selective meshing with the rack 77 before the bars 44 are actually driven by the general operator. A continued movement of the general operator will bring the plungers 68 into engagement with such of the index pins as have been set on the pounds, shillings, pence and farthings bars, advancing these bars amounts corresponding to the pins set thereon. The springs 69 are strong enough to effect this advancing movement without being extended until the very last part of the stroke of the general operator when the further movement of the set pins or the special pins 152 is obstructed by such of the slides 145 as had not been tripped for a tens-carrying operation. At this time, such of the plungers as are obstructed will recede into the general operator cross-bar, tensioning their springs 69 to enable them to effect subsequent tens-carrying operation after the general operator has come to rest, in case that is needed for delayed carry-overs. As the first and tenth pins on the tens drive bar were fruitlessly set in computing the eleven pence, they are restored by sliding up on the timing guard 154 as they come into engagement with the same, so that they will not obstruct the correct advance movement of the pence drive bar.

The special pins 152 for the tens of pounds, units, shillings, pence and farthings columns will be forced up by the timing guard 154 on top of the block 156 and the slides 145, so that they will ride idly forward, the guard being held in its raised position during the major and initial portion of the stroke of the general operator. The special pin 152 for the units of pounds column, however, while elevated to the Fig. 32 position, will not advance, inasmuch as its bar 44 is not advanced.

Inasmuch as but "3" is added to "1" in the tens of pounds column, the sum total in this column is but "4," so that the tens-carrying mechanism will not come into play in this column. Further, in the units of pounds column nothing being added, the tens-carrying mechanism to the tens of pounds column will be inactive. At this time nothing had been added in the tens of shillings column so that the tens-carrying mechanism will for the present be inactive. In the units of shillings column, "7" has been added to "3," so that the dial wheel will now show "0," and the special tooth 151 will cam out the trip 149 to release the latch 146, thereby permitting the slide 145 to recede before the tens of shillings rack bar. Inasmuch as the tens of shillings rack bar 44 has not been driven, the special pin 152 will in the meantime have remained in rear of its slide 145, having formed, however, an obstruction for the associated plunger 68, so that the spring 69 of this plunger was tensioned at the last part of the forward stroke of the general operator. This was all permitted by the timing guard 154 having been withdrawn to permit the spring 153 to depress this special pin 152 in the path of the associated plunger 68 just before the general operator completes its last step of movement. As mentioned above, the slide 145 is withdrawn by its spring when the units of shillings computing wheel trips the latch thereof. The spring 69 contracts, driving its plunger and the tens of shillings rack bar one step so as to rotate the tens of shillings computing wheel one point to carry "1." This will add one pound to the units of pounds computing wheel which already stood at "9," so that it will show "0," thereby tripping the tens-carrying mechanism for the tens of pounds computing wheel, adding "1" thereto so that the pounds computing wheels will now show "50" pounds and the shillings computing wheels would show no shillings. But eleven pence was added to one pence in the pence computing wheel, this gave twelve, which is equal to the exchange value, so that the latch to the units of shillings carry-over block was tripped, causing the units of shillings rack bar to move an added step under the impulse of its plunger 68 and its spring 69, and "1" will be shown in the units of shillings dial wheel. The pence dial wheel would show no pence if it were not for the fact that "3" had been added to "2" already exhibited in the farthings wheel, "1" to be carried to the pence wheel. This is done by one of the three special carry-over members 151 tripping the latch for the obstructing block connected with the pence driving rack bar. This causes the latter to be advanced by its plunger 68 so that one penny will now be added by rotating the pence computing wheel. The total sum then showing will be:—50 pounds, 1 shilling, 1 pence and 1 farthing.

This tens-carrying all takes place at the end of the forward stroke of the general operator. On the return stroke of the general operator, the sleeve 123 and the cams carried thereby, which were previously only rotated one-third of a revolution, will be deserted by the pawl 124, which returns idly to its home position. The work of this pawl, however, will be taken up by the pawl 130, which, in returning to its home position, will advance the sleeve and the cams carried thereby the remaining two-thirds of a revolution. On the return stroke, the cams 179 and 175 will come into play to respectively restore the pins 43 by means of the restoring roller 183, and restore the slides 145 by means of the resetting rail 169, so that by the time the general operator reaches its home position corresponding to the position 70ª of the crank in Fig. 10, all parts of the computing mechanism will be in a position to permit the setting-up and running-up of a new number. In the present instance, the general operator may be returned automatically by the springs 131, the action of which is governed so as to permit a speedy and yet cushioned return by means of the retarder 132.

If, in place of an adding operation, a subtracting operation had been desired, the subtraction key 110 would have been depressed before the action of the general operator, so as to depress the bar 97 in its Figs. 31 and 32 position. Under such circumstances, on the initial or forward stroke of the general operator, the gears 79 will be brought into mesh with the racks 77 in place of the gears 78, so that the dial wheels 82 will be rotated in the opposite direction. The tens-carrying will take place as before, inasmuch as it is immaterial which way the computing wheels rotate, for in both directions of rotation they will trip the tens-carrying units.

Variations may be resorted to within the scope of the invention, and portions of the improvements may be used without others.

Having thus described my invention, I claim:

1. In a sterling computing machine, the combination with typewriting mechanism adapted to print, digit by digit, the sterling numbers to be computed, of a set of denominational bars including one pence bar for all pence, index pins on each bar for temporarily registering the computation, computing wheels to receive the registered computation, and means operative when printing in the tens of pence column to set up ten pence by a pin on said pence bar.

2. In a sterling computing machine, the combination with typewriting mechanism adapted to print, digit by digit, the sterling numbers to be computed, of a set of denominational bars including one pence bar for all pence, index pins on each bar for temporarily registering the computation, computing wheels to receive the registered computation, means operative when printing in the tens of pence column to set up ten pence by a pin on said pence bar, and connections made effective by printing in said tens of pence column enabling said means to set up eleven pence on said pence bar when in the units of pence column.

3. The combination with computing wheels, of denominational bars, pins settable on said bars to determine the extent of rotation of said computing wheels, setting mechanism for setting said pins, a pinless supplementary bar, means for advancing said denominational bars *seriatim* to bring said pins from a normally inoperable to a settable position, and connections enabling said supplementary bar to be advanced by one of said denominational bars into the range of said setting mechanism.

4. In a computing machine, the combination with typewriting mechanism, of a series of computing wheels, devices on which the digits printed by the typewriting mechanism are registered to be carried into said wheels, said devices including a registering device for the units of pence digits and a non-registering device for the tens of pence digits, and a connection between said tens of pence device and the units of pence device whereby digits printed for tens of pence are registered in the units of pence device.

5. The combination with a computing wheel, of a rack bar for driving said computing wheel, non-decimal index pins on said rack bar, setting means for said pins constituted so as to fruitlessly set one or more pins in advance of the correct pin, and a guard for restoring the uselessly-set pins to prevent their obstructing the movement of the rack bar on which they are set.

6. The combination with a pence computing wheel, of a pence rack bar for driving said computing wheel, a series of pins settable on said rack bar to determine the extent of movement thereof, and ranging in values from "1" to "11", setting means for said pins operating when setting the "11" pin to set the "1" pin, and restoring means acting during a driving movement of said bar to return the "1" pin to its original position.

7. The combination with a pence computing wheel, of a pence rack bar for driving said computing wheel, a series of index pins on said bar ranging in values from "1" to "11", setting mechanism for said pins acting to set the "1" pin, the "10" pin, and the "11" pin when computing eleven pence, and means for nullifying the extra setting of the "1" and "10" pins.

8. The combination with a series of computing elements arranged in successive denominations, of settable pins on a plurality of said elements for determining the extent of computing action thereof, means for bringing said elements to setting position seriatim, a device settable on a special element to put it under the control of an adjoining element, and a device operable on said special element to effect a pin-setting on said adjoining element.

9. The combination with a series of computing elements arranged in successive denominations, of settable pins on a plurality of said elements for determining the extent of computing action thereof, setting mechanism for said pins, and setting elements enabling a setting on a computing element in one denomination from a computing element in another denomination, while computing in the same or another digit column.

10. The combination with a computing wheel, of a rack bar for driving said computing wheel, a series of pins on said bar settable to determine the extent of driving movement thereof, a supernumerary bar adjacent said first-mentioned bar, and mechanism on said supernumerary bar overlying certain of the pins on said rack bar to set the same.

11. The combination with a pence computing wheel, of a pence drive bar for said computing wheel, a series of pins on said pence drive bar for representing different values in pence, a supernumerary bar, and mechanism on said supernumerary bar adapted to be positioned to effect the setting of pins on said pence drive bar corresponding to values greater than nine pence.

12. The combination with a drive bar, of a series of index pins settable on said drive bar to determine the extent of movement thereof, setting linkages for said pins, an interponent series of pins forming a means of connection between said setting linkages and said index pins, an auxiliary interponent bar, and a lever mechanism on said auxiliary interponent bar operable by said setting linkages to operate certain of said interponent pins, to set certain of said index pins.

13. The combination with a drive bar, of a series of index pins settable on said drive bar to determine the extent of movement thereof, an interponent bar, a series of interponent pins on said bar, an auxiliary interponent bar, a compound lever on said interponent bar extending over pins on said first-mentioned interponent bar, setting linkages operable to actuate said interponent pins and said lever to set said index pins, and means for shifting said auxiliary interponent bar to bring said lever within the range of action of a setting linkage, so that the pins on said drive bar may be set through the intermediary of said linkage, said lever, and said interponent pins.

14. The combination with a drive bar, of a series of pins settable on said drive bar to determine the extent of movement thereof, setting linkages for said pins, a series of interponent pins between said linkages and said index pins normally out of coöperative relation therewith, an auxiliary interponent bar connected to operate certain of said interponent pins, and means for enabling the advance of said auxiliary interponent bar and said interponent pins in unison into the range of said setting linkages.

15. The combination with a denominational bar, of a series of pins on said bar ranging in values from "1" to "11," the pins "1" to "9" being arranged on a level with each other, and the "10" and "11" pins being depressed relatively to the remaining pins, to give a difference in level, and means projecting in the difference in level above the "10" and "11" pins for actuating these pins.

16. The combination with a series of denominational members, of a series of pins on each of said denominational members settable to determine the extent of movement thereof, setting mechanism for said pins, a pin on one of said denominational members being higher in value than the pins on the other denominational members, a part of said setting mechanism being normally in register with this higher-valued pin, while the rest of said setting mechanism is out of register with the remaining pins, and means for enabling the setting of said higher-valued pin solely when computing in the denomination of the member on which the said pin is located.

17. The combination with a nest of pins settable to determine extents of computations, of setting mechanism for said pins out of register with all but one of said pins and acting to set the same when brought into register therewith, and means to enable the setting of the pin in which said setting mechanism is normally in register solely when computing in the denomination or order in which said pin is located.

18. In a combined typewriting and computing machine, the combination with digit keys ranging from "1" to "9," of decimal denominational elements, a non-decimal element, pins adapted to be set on all said elements to represent the amounts written, a single linkage operated by each key for setting the pins, a special denominational element, and a lever on said special element adapted to be operated by one of said keys to selectively set the pins on the non-decimal element out of range of said linkages.

19. In a computing machine, the combination with a denominational member, of a series of pins settable on said member to determine extents of movement thereof, a general operator, a plunger on said general operator to engage said pins, a lever engaging said plunger, and a spring engaging said lever to maintain said plunger in rigid engagement with any of said set pins when under driving pressure.

20. In a computing machine, the combination with computing wheels, of driving means for said computing wheels, and actuating means for said driving means, including a general operator, a series of plungers adjustably mounted on said general operator, a fulcrumed lever engaging each of said plungers, and a tension spring acting on each of said levers intermediate the ends thereof, to normally hold the associated plunger in a protruded position.

21. In a computing machine, the combination with a general operator having a grooved rod thereon, of a series of levers supported by engaging said groove, plungers connected to move with said levers, and springs maintaining said plungers and said levers in a normal position.

22. In a computing machine, the combination with a general operator having an apertured cross-bar and a grooved rod, of a series of plungers slidingly mounted in said cross-bar, a series of levers extending through the apertures in said cross-bar engaging said plungers at one end, and hung on said rod by engaging said groove at the other end, and springs engaging said levers intermediate their ends to hold said plungers in a normal position.

23. In a computing machine, the combination with a plurality of computing elements adapted to be driven to compute, of a general operator for driving them, a series of plungers, one for each element by which the operator does the driving, an opening in said operator adjacent said plungers, a floating lever for each plunger playing in said opening, a bar outside of said opening against which said levers are pivoted by a V and knife edge, and a spring for each lever drawing it against the bar and drawing the plunger to its outermost driving position.

24. In a computing machine, the combination with a register, of actuating means therefor, comprising a pence driving bar, means whereby numbers from "1" to "11" may be indexed thereon, means to index from "1" to "9" while computing in the units of pence denomination, means effective to index "10" on said bar when computing in the tens of pence denomination and means, whereby upon indexing "1" in the units of pence denomination, following such indexing of "10," an indexing of "1" will be effected upon said bar.

25. In a sterling machine, the combination with a pence-indexing bar, of a units of pence interponent bar, a tens of pence interponent bar, a projection on one of said interponent bars, a lug on the other of said interponent bars, and means for bringing about a change in the relation of said lug and said projection, so as to enable the advance of one of the interponent bars from the other of the interponent bars within cooperative reach of said indexing bar.

26. In a sterling machine, the combination with a pence-indexing bar, of a units of pence setting bar, a tens of pence setting bar, means for shifting said setting bars individually from an inactive position to an active position, a lug on said units of pence setting bar, a lever pivotally mounted on said tens of pence setting bar having a projection capable of engaging said lug, said lug and said projection normally being in a disengaged position, and mechanism for shifting said lever to bring about an engagement of said lug and said projection when "1" is computed in the tens of pence denomination, so as to enable a subsequent advancing of the tens of pence setting bar with an advancement to active position of the units of pence setting bar.

27. In a sterling machine, the combination with a pence-indexing bar, of a units of pence setting bar, a tens of pence setting bar, means for shifting said setting bars individually from an inactive position to an active position, a lug on said units of pence setting bar, a lever pivotally mounted on said tens of pence setting bar having a projection capable of engaging said lug, said lug and said projection normally being in a disengaged position, mechanism for shifting said lever to bring about an engagement of said lug and said projection when "1" is computed in the tens of pence denomination, so as to enable a subsequent advancing of the tens of pence setting bar with an advancement to active position of the units of pence setting bar, and disconnecting means operative when the indexing bar makes a driving movement to shift said lever with said projection and lug out of engagement with each other, so as to enable subsequent independent movement of said setting bars.

28. In a sterling machine, the combination with units of pence computing elements, of tens of pence computing elements, denomination-selecting devices, normally ineffective, connections between said elements brought into play incident to the computing of "1" in the tens of pence denomination to connect them for denomination-selecting, and disconnecting means for interrupting said connections to enable subsequent independent action of the units of pence computing elements.

29. In a sterling machine, the combination with a units of pence computing element having a series of pins, of a tens of pence computing element having a compound lever projecting over certain of said pins to operate the same, a connecting lever on said tens of pence computing element operated by said compound lever when actuating one of said pins to form a connection between said computing elements enabling a subsequent actuation of another of said pins by said compound lever.

30. In a combined typewriting and computing machine, the combination with digit keys ranging from "1" to "9," of decimal denominational elements, a non-decimal element, pins adapted to be set on all said elements to represent the amount written, a single linkage operated by each key for setting the pins, a special denominational element, a denomination-selecting device for moving said elements one after another to computing position, and a lever on said special element normally ineffective but adapted to be brought to operable position by said denomination-selecting device to set a pin on said non-decimal element.

31. In a combined typewriting and computing machine, the combination with digit keys ranging from "1" to "9," of decimal denominational elements, a non-decimal element, pins adapted to be set on all said elements to represent the amount written, a single linkage operated by each key for setting the pins, a special denominational element, a denomination-selecting device for moving said elements one after another to computing position, a lever on said special element normally ineffective but adapted to be brought to operable position by said denomination-selecting device to set a pin on said non-decimal element, and a device on said special denominational element adapted to put it under the control of the non-decimal element in denomination selecting.

32. In a combined typewriting and computing machine, the combination with digit keys ranging from "1" to "9," of decimal denominational elements, a non-decimal element, pins adapted to be set on said elements to represent the amount written, a single linkage operated by each key for setting the pins, a special denominational element, a denomination-selecting device for moving said elements one after another to computing position, a lever on said special element normally inoperable, but adapted to be brought to operable position by said denomination-selecting device to set a pin on said non-decimal element, a device on said special denominational element adapted to put it under the control of the non-decimal element in denomination selecting, with the result that said lever may be operated in two denominational positions of the selecting device, thereby selectively setting pins on said non-decimal element.

33. In a combined typewriting and computing machine, the combination with digit keys ranging from "1" to "9," of decimal denominational elements, a non-decimal element, pins adapted to be set on all said elements to represent the amount written, a single linkage operated by each key for setting the pins, a special denominational element, a denomination-selecting device for moving said elements one after another to computing position, a lever on said special element normally ineffective but adapted to be brought to operable position by said denomination-selecting device to set a pin on said non-decimal element, and a normally ineffective lug on said special element adapted to be made effective by said lever to cause the element to be moved with the non-decimal element when the latter is moved to computing position.

34. In a combined typewriting and computing machine, the combination with digit keys ranging from "1" to "9," of decimal denominational elements, a non-decimal element, pins in rows adapted to be set on all of said elements to represent the amount written, a single linkage operated by each key for setting the pins in a given row, certain of the pins on the non-decimal element lying outside said rows, a special denominational element, a denomination-selecting device for moving said elements one after another to computing position, and normally ineffective means on said special element adapted to be brought to operable position by said denomination-selecting device to selectively set a pin on said non-decimal element outside of the row at the operation of one of said linkages.

35. In a combined typewriting and computing machine, the combination with digit keys ranging from "1" to "9," of decimal denominational elements, a non-decimal element, pins in rows adapted to be set on all of said elements to represent the amount written, a single linkage operated by each key for setting the pins in a given row, certain of the pins on the non-decimal element lying outside said rows, a special denominational element, a denomination-selecting device for moving said elements one after another to computing position, means on said special element normally ineffective but adapted to be brought to operable position by said denomination-selecting device to set a pin on said non-decimal element, so that two pins are set on said non-decimal element, and means for restoring an erroneously set pin to enable computing to be unimpeded thereby.

36. In a combined typewriting and computing machine, the combination with digit keys ranging from "1" to "9," of decimal denominational elements, a non-decimal element, pins in rows adapted to be set on all of said elements to represent the amount written, a single linkage operated by each key for setting the pins in a given row, a "10" pin and an "11" pin on said non-decimal element lying outside said rows, means on said special element for setting said "11" pin, the setting of said "11" pin being accompanied by the setting of another pin on said non-decimal element, and means for restoring the pin erroneously set at the setting of the "11" pin.

37. In a computing machine, the combination with typewriting mechanism adapted to print, digit by digit, decimal numbers and non-decimal numbers, of a set of denominational bars including one pence bar for a group of non-decimal numbers greater than ten, index pins on each bar for temporarily registering the computation, computing wheels to receive the registered computation, means operative when printing in tens of pence column to set up ten pence by a pin on said pence bar, and means for causing the computing wheels in receiving the registered computation to be turned either additively or subtractively.

38. In a computing machine, the combination with denominational members and pins thereon, of pin-setting linkages effective on a plurality of pins on each member, a special denominational member, a plurality of pins on the adjoining denominational member clear of said linkages, a linkage operated lever on said special member normally operable to set one of said latter pins, and means for shifting said member to cause said lever to be effective on another of said latter pins.

39. In a computing machine, the combination with denominational members and pins thereon, of pin-setting linkages effective on a plurality of pins on each member, a special denominational member, a plurality of pins on the adjoining denominational member clear of said linkages, a linkage operated lever on said special member normally operable to set one of said latter pins, and means for shifting said member by said adjoining member to cause said lever to be effective on another of said latter pins.

40. In a computing machine, the combination of a pence computing wheel, of driving means therefor including a reciprocable bar and a series of devices on said bar settable to determine the extent of movements thereof, and ranging in value from "1" to "11," means effective when setting a device higher in value than the "9" device, to set a device of lower value on said bar, and restoring means acting during the driving movement of said bar to return said device of lower value to its normal position.

41. In a computing machine, the combination with a driving bar having settable pins thereon ranging from "1" to "11," of keys numbered from "1" to "9," key-actuated linkages positioned respectively above the first nine of said pins but spaced therefrom, an intermediate bar having eleven setting pins normally out of alinement with the pins of said driving bar, the "10" pin of said intermediate bar having an offset portion extending over the "10" pin of said driving bar, an auxiliary bar adjacent said intermediate bar, a device on said auxiliary bar having a portion normally overlying the "11" pin of the intermediate bar and a projection alined with the "1" pin on said intermediate bar, the overlying portion and the projection being so connected that depression of the latter will effect depression of the former, means to move said auxiliary bar to bring said projection into the path of the "1" linkage and said overlying portion over the "10" pin of said intermediate bar, to enable the setting of the last-mentioned pin, and means rendered effective upon the setting of said "10" pin to effect a movement of said auxiliary bar with said intermediate bar, thereby enabling a concomitant setting of the "1" and "11" pins on said intermediate bar.

FREDERICK A. HART.

Witnesses:
ARTHUR A. JOHNSON,
CATHERINE A. NEWELL.